United States Patent
Jin et al.

(10) Patent No.: US 10,254,413 B2
(45) Date of Patent: Apr. 9, 2019

(54) METHOD AND APPARATUS FOR WIRELESS COMMUNICATION IN WIRELESS COMMUNICATION SYSTEM

(71) Applicant: Samsung Electronics Co., Ltd, Gyeonggi-do (KR)

(72) Inventors: Seungri Jin, Suwon-si (KR); Soenghun Kim, Suwon-si (KR); Sangbum Kim, Suwon-si (KR); Jaehyuk Jang, Suwon-si (KR); Gert-Jan Van Lieshout, Middlesex (GB); Himke Van Der Velde, Middlesex (GB); Alexander Sayenko, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/476,973

(22) Filed: Apr. 1, 2017

(65) Prior Publication Data

US 2017/0285177 A1    Oct. 5, 2017

Related U.S. Application Data

(63) Continuation of application No. 15/476,794, filed on Mar. 31, 2017.

(30) Foreign Application Priority Data

Apr. 1, 2016  (KR) .......................... 10-2016-0040209
May 18, 2016  (KR) .......................... 10-2016-0061054

(51) Int. Cl.
*G01S 5/00* (2006.01)
*G01S 5/02* (2010.01)
(Continued)

(52) U.S. Cl.
CPC ............ *G01S 19/42* (2013.01); *G01S 5/0054* (2013.01); *G01S 5/0063* (2013.01);
(Continued)

(58) Field of Classification Search
CPC ................................ G01S 19/09; G01S 19/46
See application file for complete search history.

(56) References Cited

U.S. PATENT DOCUMENTS

| 2008/0186936 A1 | 8/2008 | Chun et al. |
| 2009/0003283 A1 | 1/2009 | Meylan |

(Continued)

FOREIGN PATENT DOCUMENTS

| WO | WO-2017118229 A1 * | 7/2017 | ............ H04W 72/04 |
| WO | WO-2017128274 A1 * | 8/2017 | ............ H04W 72/12 |

OTHER PUBLICATIONS

International Search Report for PCT Application No. PCT/KR2017/003558, dated Jul. 4, 2017. (3 pages).
(Continued)

*Primary Examiner* — Chandrahas B Patel

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The vehicle-to-everything (V2X) communication method by a terminal in a wireless communication system includes transmitting, to a base station, a first message including assistance information associated with a semi-persistent scheduling (SPS) for the V2X communication,
(Continued)

receiving, from the base station, a second message including SPS configuration information for the V2X communication, receiving, from the base station, a third message including downlink control information (DCI) associated with activation of the SPS for the V2X communication, and transmitting, to another terminal, data based on the SPS configuration information and the DCI.

15 Claims, 18 Drawing Sheets

(51) Int. Cl.
    *G01V 3/08*     (2006.01)
    *G01S 19/42*     (2010.01)
    *H04L 29/08*     (2006.01)
    *H04W 24/08*     (2009.01)
    *H04W 72/04*     (2009.01)
    *H04W 84/18*     (2009.01)
    *H04W 84/12*     (2009.01)
    *H04W 92/02*     (2009.01)

(52) U.S. Cl.
    CPC .......... *G01S 5/0268* (2013.01); *G01S 5/0273* (2013.01); *G01V 3/08* (2013.01); *H04L 29/08306* (2013.01); *H04L 67/12* (2013.01); *H04W 24/08* (2013.01); *H04W 72/042* (2013.01); *H04W 72/0406* (2013.01); *H04W 84/18* (2013.01); *H04W 84/12* (2013.01); *H04W 92/02* (2013.01)

(56) References Cited

U.S. PATENT DOCUMENTS

| | | |
|---|---|---|
| 2009/0046608 A1 | 2/2009 | Jiang |
| 2009/0086646 A1 | 4/2009 | Kuchibhotla et al. |
| 2009/0086659 A1 | 4/2009 | Pani et al. |
| 2015/0078153 A1 | 3/2015 | Kuo et al. |
| 2015/0215839 A1 | 7/2015 | Johansson et al. |
| 2015/0264597 A1 | 9/2015 | Zhang et al. |
| 2015/0365868 A1 | 12/2015 | Chang et al. |
| 2016/0007268 A1 | 1/2016 | Jung et al. |
| 2016/0044567 A1 | 2/2016 | Baghel et al. |
| 2016/0050709 A1 | 2/2016 | Bergstrom |
| 2016/0080958 A1 | 3/2016 | Rinne et al. |
| 2016/0135143 A1 | 5/2016 | Won et al. |
| 2017/0094577 A1 | 3/2017 | Kim et al. |

OTHER PUBLICATIONS

International Search Report dated Aug. 7, 2017 in connection with International Patent Application No. PCT/KR2017/005190.
European Patent Office, "Supplementary European Search Report," Application No. EP 17775899.2, dated Feb. 13, 2019, 9 pages.

* cited by examiner

METHOD AND APPARATUS FOR WIRELESS COMMUNICATION IN WIRELESS COMMUNICATION SYSTEM

CROSS-REFERENCE TO RELATED APPLICATIONS AND CLAIM OF PRIORITY

The present application is a continuation of U.S. application Ser. No. 15/476,794 filed Mar. 31, 2017 and is related to and claims the benefit under 35 U.S.C. § 119(a) to Korean patent application Ser. No. 10-2016-0040209 filed on Apr. 1, 2016 and Korean patent application Ser. No. 10-2016-0061054 filed on May 18, 2016 in the Korean intellectual property office, the entire disclosures of which are hereby incorporated by reference.

TECHNICAL FIELD

Various embodiments of the present invention relate to a method and an apparatus for wireless communication in a wireless communication system, and more particularly, to semi-persistent scheduling in vehicle-to-everything (V2X).

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

Objects of the present invention are not limited to the above-mentioned objects. That is, other objects that are not mentioned may be obviously understood by those skilled in the art to which the present invention pertains from the following description.

Accordingly, embodiments of the present invention are directed to the provision of a vehicle-to-everything (V2X) communication method by a terminal in a wireless communication system, the method comprising: transmitting, to a base station, a first message including assistance information associated with a semi-persistent scheduling (SPS) for the V2X communication; receiving, from the base station, a second message including SPS configuration information for the V2X communication; receiving, from the base station, a third message including downlink control information (DCI) associated with activation of the SPS for the V2X communication; and transmitting, to another terminal, data based on the SPS configuration information and the DCI.

Accordingly, embodiments of the present invention are directed to the provision of A method by a base station supporting a vehicle-to-everything (V2X) communication in a wireless communication system, the method comprising: receiving, from a terminal, a first message including assistance information associated with a semi-persistent scheduling (SPS) for the V2X communication; transmitting, to the terminal, a second message including SPS configuration information for the V2X communication; and transmitting, to the terminal, a third message including downlink control information (DCI) associated with activation of the SPS for the V2X communication, wherein data is transmitted from the terminal to another terminal based on the SPS configuration information and the DCI.

Accordingly, embodiments of the present invention are directed to the provision of a terminal performing a vehicle-to-everything (V2X) communication in a wireless communication system, the terminal comprising: a transceiver configured to transmit and receive signals; and a controller configured to: transmit, to a base station, a first message including assistance information associated with a semi-persistent scheduling (SPS) for the V2X communication; receive, from the base station, a second message including SPS configuration information for the V2X communication; receive, from the base station, a third message including downlink control information (DCI) associated with activation of the SPS for the V2X communication; and transmit, to another terminal, data based on the SPS configuration information and the DCI.

A base station supporting a vehicle-to-everything (V2X) communication in a wireless communication system, the base station comprising: a transceiver configured to transmit and receive signals; and a controller configured to: receive, from a terminal, a first message including assistance information associated with a semi-persistent scheduling (SPS) for the V2X communication; transmit, to the terminal, a second message including SPS configuration information for the V2X communication; and transmit, to the terminal, a third message including downlink control information (DCI) associated with activation of the SPS for the V2X communication, wherein data is transmitted from the terminal to another terminal based on the SPS configuration information and the DCI.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2I is a diagram illustrating a process of assigning sidelink resources using the geographical location information in the V2V according to the second embodiment of the present invention.

DETAILED DESCRIPTION

Figure 1A:
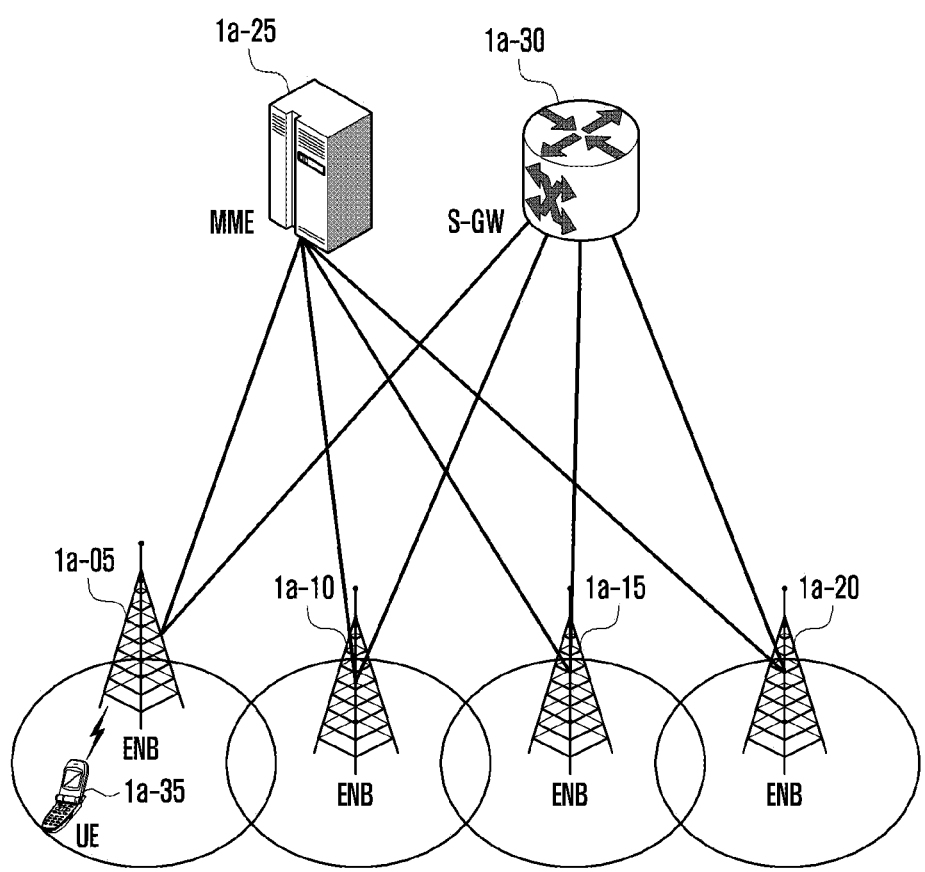
FIG. 1A is a diagram illustrating an example of a network structure of a wireless communication system to which the present invention is applied.

FIGS. 1A through 2L, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, embodiments of the present invention will be described in detail with reference to the accompanying drawings. When it is decided that a detailed description for the known function or configuration related to the present invention may obscure the gist of the present invention, the detailed description therefor will be omitted. Further, the following terminologies are defined in consideration of the functions in the present invention and may be construed in different ways by the intention of users and operators. Therefore, the definitions thereof should be construed based on the contents throughout the specification.

Various advantages and features of the present invention and methods accomplishing the same will become apparent from the following detailed description of embodiments with reference to the accompanying drawings. However, the present invention is not limited to the embodiments disclosed herein but will be implemented in various forms. The embodiments have made disclosure of the present invention complete and are provided so that those skilled in the art may easily understand the scope of the present invention. Therefore, the present invention will be defined by the scope of the appended claims. Like reference numerals throughout the description denote like elements.

Hereinafter, an operation principle of the present invention will be described in detail with reference to the accompanying drawings. Hereinafter, when it is determined that the detailed description of the known art related to the present invention may obscure the gist of the present invention, the detailed description thereof will be omitted. Further, the following terminologies are defined in consideration of the functions in the present invention and may be construed in different ways by the intention of users and operators. Therefore, the definitions thereof should be construed based on the contents throughout the specification.

Terms identifying an access node, terms indicating network entity, terms indicating messages, terms indicating an interface between network entities, terms indicating various types of identification information, and so on that are used in the following description are exemplified for convenience of explanation. Accordingly, the present invention is not limited to terms to be described below and other terms indicating objects having the equivalent technical meaning may be used.

Hereafter, for convenience of explanation, the present invention uses terms and names defined in the 3rd generation partnership project long term evolution (3GPP LTE). However, the present invention is not limited to the terms and names but may also be identically applied to the systems according to other standards such as the 5G system.

First Embodiment

FIG. 1A is a diagram illustrating a structure of an LTE system that is an example of a wireless communication system.

Referring to FIG. 1A, the wireless communication system is configured to include a plurality of base stations 1a-05, 1a-10, 1a-15, and 1a-20, a mobility management entity (MME) 1a-20, a serving-gateway (S-GW) 1a-30. A user equipment (hereinafter, referred to as terminal or mobile station (MS)) 1a-35 is connected to an external network through eNodeB (hereinafter, referred to as ENB or base station) 1a-05, 1a-10, 1a-15, and 1a-20 and the S-GW 1a-30.

The base stations 1a05, 1a-10, 1a-15, and 1a-20 are access nodes of a cellular network and provide a radio access to terminals that are connected to a network. That is, in order to serve traffic of users, the base stations 1a-05, 1a-10, 1a-15, and 1a-20 collect state information such as a buffer state, an available transmission power state, a channel state, or the like of the terminals to perform scheduling, thereby supporting a connection between the terminals and a core network (CN). The MME 1a-25 is an apparatus for performing various control functions as well as a mobility management function for the terminal and is connected to a plurality of base stations, and the S-GW 1a-30 is an apparatus for providing a data bearer. Further, the MME 1a-25 and the S-GW 1a-30 may further perform authentication, bearer management, etc., on the terminal connected to the network and may process packets that are to be received from the base stations 1a-05, 1a-10, 1a-15, and 1a-20 and packets that are to be transmitted to the base stations 1a-05, 1a-10, 1a-15, and 1a-20.

Figure 1B:
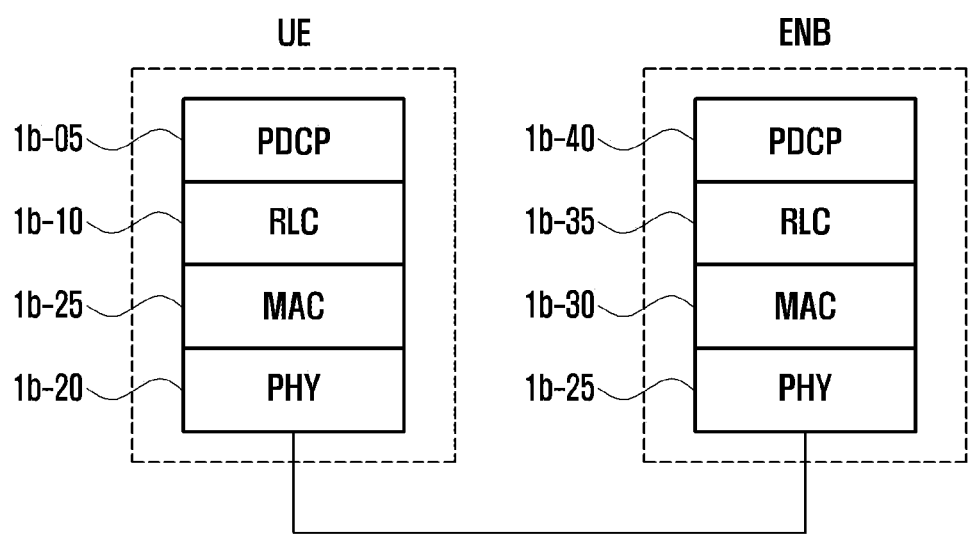
FIG. 1B is a diagram illustrating a radio protocol structure in an LTE system to which the present invention is applied.

FIG. 1B is a diagram illustrating a radio protocol structure in the LTE system.

Referring to FIG. 1B, the radio protocol of the LTE system consists of packet data convergence protocols (PDCPs) 1b-05 and 1b-40, radio link controls (RLCs) 1b-10 and 1b-35, and medium access controls (MMCs) 1b-15 and 1b-30 in the terminal and the ENB, respectively. The packet data convergence protocols (PDCPs) 1b-05 and 1b-40 performs operations such as compression/recovery of an IP header and the radio link controls (hereinafter, referred to as RLC) 1b-10 and 1b-35 reconfigure a PDCP packet data unit (PDU) at an appropriate size. The MACs 1b-15 and 1b-30 are connected to several RLC layer devices configured in one terminal and perform an operation of multiplexing RLC PDUs in an MAC PDU and demultiplexing the RLC PDUs from the MAC PDU. Physical layers 1b-20 and 1b-25 perform an operation of channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer. Further, even the physical layer uses an a hybrid ARQ for additional error correction and a receiving end transmits whether to receive a packet transmitted from a transmitting end by 1 bit. This is called HARQ ACK/NACK information. The downlink HARQ ACK/NACK information on the uplink transmission may be transmitted through a physical hybrid-ARQ indicator channel (PHICH) physical channel and the uplink HARQ ACK/NACK information on the downlink transmission may be transmitted through a physical uplink control channel (PUCCH) or physical uplink shared channel (PUSCH) physical channel.

Although not illustrated in the present drawings, radio resource control (hereinafter, referred to as RRC) layers is present at an upper part of the PDCP layer of the terminal and the base station, and the RRC layer may receive and transmit connection and measurement related control messages for a radio resource control.

Figure 1C:
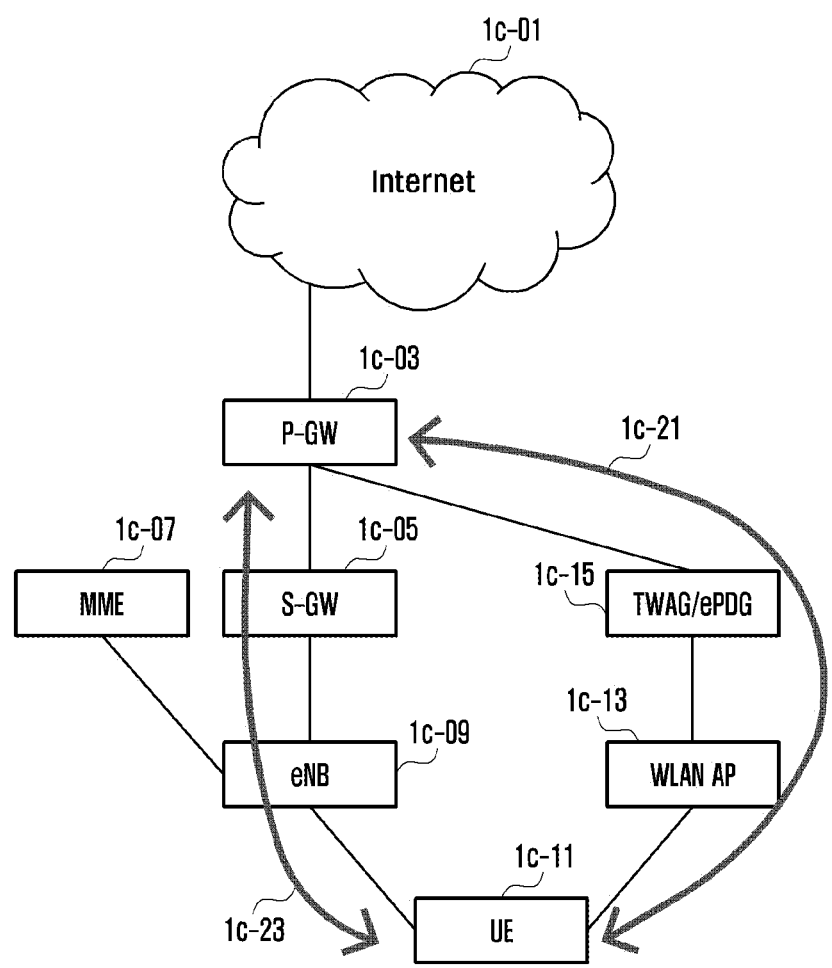
FIG. 1C is a device diagram of a system in which RAN-controlled LTE-WLAN interworking (RCLWI) is used in an LTE system according to a first embodiment of the present invention.

FIG. 1C is a device diagram of the system in which the RAN-controlled LTE-WLAN interworking (hereinafter, referred to as RCLWI) are used in the LTE system according to the first embodiment of the present invention.

FIG. 1C, a terminal 1c-11 and a base station 1c-09 transmit and receive a control message of the RRC layer. The control message includes a wireless LAN measurement related message. If the base station 1c-09 sets up the wireless LAN measurement in the terminal 1c-11, the terminal 1c-11 may report a wireless LAN measurement result to the base station 1c-09 depending on the measurement setting. Accordingly, the base station 1c-09 may determine whether traffic may move to the wireless LAN to instruct the terminal 1c-11 to move the traffic, which may move to the wireless LAN, to the wireless LAN. An MME 1c-07 transmits information on the traffic, which may move to the wireless LAN, to the terminal 1c-11 before the above operation to determine which traffic may move to the wireless LAN when the terminal 1c-11 receives a movement instruction to the wireless LAN. More specifically, a terminal 1c-11 acquires an IP address used in an external Internet network 1c-01 through a PDN-GW 1c-03, and the terminal 1c-11 may receive a plurality of IP addresses, in which each IP address corresponds to packet data network (PDN) connections. That is, each PDN connection has different IP addresses. Further, the MME 1c-07 may notify whether the corresponding PDN connection may move to the wireless LAN every time each PDN connection is set in the terminal 1c-11.

If the terminal 1c-11 receives information on the PDN connection that may move from the MME 1c-07 to the wireless LAN and receives the movement instruction from the base station 1c-09 to the wireless LAN, the terminal 1c-11 accesses a wireless LAN access point (hereinafter, referred to as AP) 1c-13 to communicate with a predetermined CN device 1c-15 via a wireless LAN AP 1c-13, thereby notifying that the movement of the corresponding PDN to the wireless LAN is required. The predetermined CN device 1c-15 receiving the notification notifies a PDN-GW 1c-21 that the movement of the corresponding PDN connection to the wireless LAN is required, thereby updating the configuration information so that traffic transmitted from the Internet by the corresponding PDN connection is transmitted to the wireless LAN later. Accordingly, the terminal 1c-11 may transmit and receive the PDN connection traffic to and from the wireless LAN 1c-21. Meanwhile, the PDN connection traffic that may not be transmitted to the wireless LAN may still be transmitted and received through an LTE network 1c-23. Although the embodiment of the present invention has described, by way of example, an LTE network, it is also applicable even to other wireless network systems such as a 5G network.

Figure 1D:
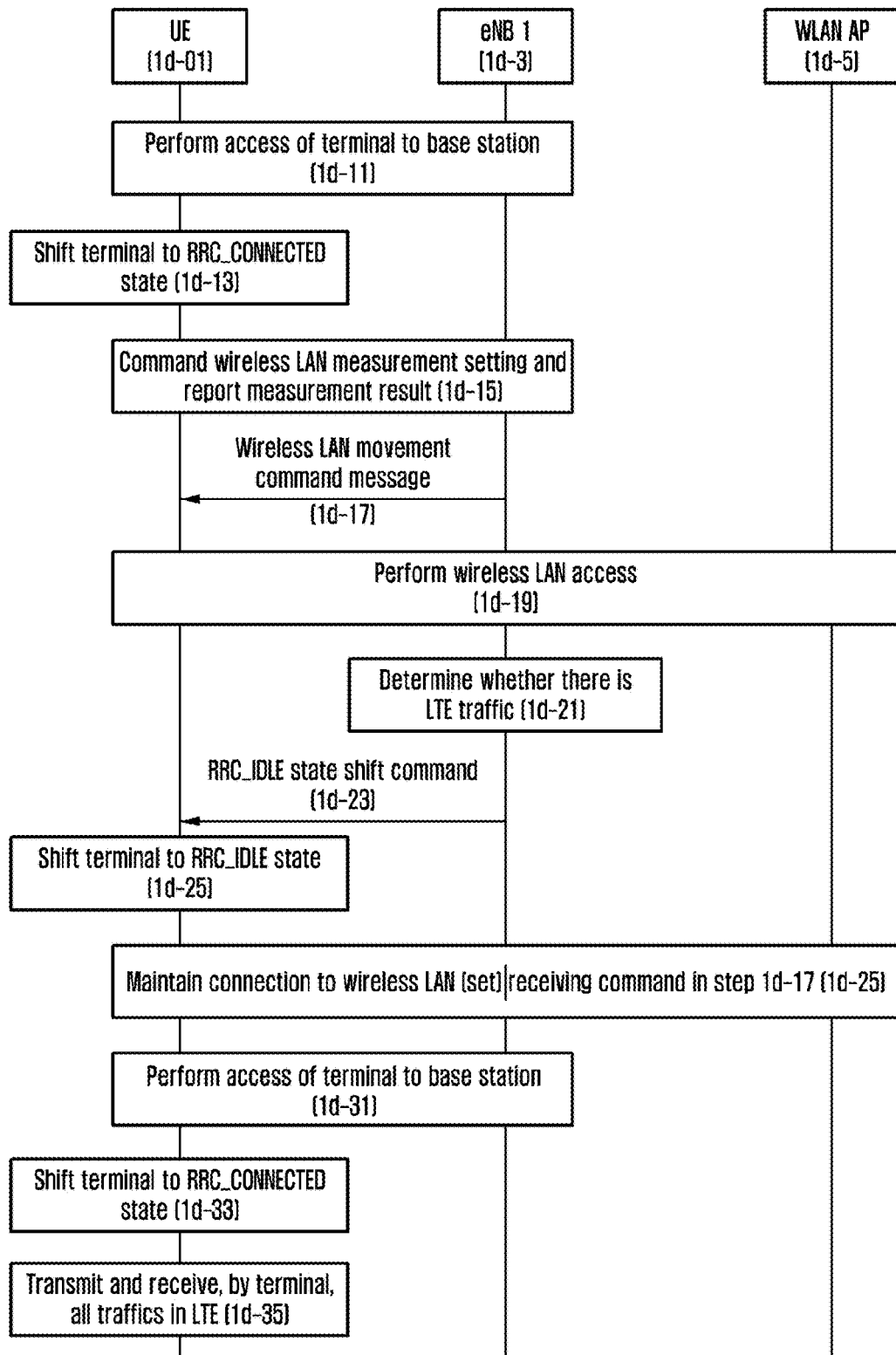
FIG. 1D is an exemplified diagram of a message flow between a terminal and a base station depending on a state shift of a terminal when the RAN-controlled LTE-WLAN interworking (RCLWI) according to the first embodiment of the present invention is applied.

FIG. 1D is an exemplified diagram illustrating a message flow among a terminal 1d-01, a base station 1d-03, and a wireless LAN AP 1d-05 depending on the state shift of the terminal when the RAN-Controlled LTE-WLAN Interworking (RCLWI) according to the first embodiment of the present invention is applied. Although the present embodiment has described, by way of example, the LTE base station, it is to be understood that the embodiment of the present invention is not limited thereto.

In FIG. 1D, it is assumed (1d-13) that the terminal 1d-01 transmits an access request message to the base station 1d-03 to perform an access procedure (1d-11) and thus the terminal 1d-01 is in a radio resource connection (RRC)_CONNECTED state that is a state where the terminal accesses the corresponding base station 1d-03. In the RRC_CONNECTED state, the terminal 1d-01 may transmit and receive a control and user data message to and from the base station 1d-03.

Next, in order to use the RCLWI function, the base station 1d-03 may transmit the configuration information to the terminal 1d-01 and thus may be set to perform measurement of neighboring WLAN APs. The configuration information may include at least one of information on which wireless LAN AP (or a set of APs) is to be measured and report condition related configuration information on whether to report the measurement result to the base station under certain conditions. The terminal 1d-01 performs the measurement of the neighboring wireless LAN APs depending on the configuration information and if the report conditions of the configuration information is met, may report the measurement result to the base station 1d-03 (1d-15).

The base station 1d-03 receiving the report may transmit control information including an instruction to move traffic to the wireless LAN AP (or set of APs) to the terminal 1d-01 (1d-17). The control information or the movement instruction may include at least one wireless LAN identifier. The control information may be transmitted by being included in an RRC connection reconfiguration message, for example. The terminal 1d-01 that has received the instruction accesses the wireless LAN AP 1d-05 corresponding to the instruction (1d-19), and thus may perform the operations described with reference to FIG. 1C to transmit and receive traffic, which belongs to the PDN connection permitted to move to the wireless LAN among the set PDN connections, to and from the current terminal 1d-01 through the wireless LAN 1d-05 (1c-21 of FIG. 1C).

Next, the base station 1d-03 may determine whether there is LTE traffic remaining in the terminal among the traffics (1c-23 of FIG. 1C) to be transmitted and received in the LTE to determine whether the terminal 1d-01 is continuously maintained in the RRC_CONNECTED state or otherwise whether the terminal is shifted to the RRC_IDLE state by releasing the connected state of the terminal (1d-21). If the terminal is shifted to the RRC_IDLE state, the terminal 1d-01 may not directly communicate with the base station 1d-03 but the power consumption of the terminal may be reduced and the base station 1d-03 does not have a burden of maintaining the information on the corresponding terminal. According to the determination result, the base station 1d-03 may transmit an RRC connection release message to the terminal 1d-01 for shifting to the RRC_IDLE state (1d-23), thereby shifting the terminal 1d-01 to the RRC_IDLE state (1d-25).

Even if the terminal 1d-01 is shifted to the RRC_IDLE state, the terminal 1d-01 may continuously maintain the control information including the movement instruction received in step 2d-17 to continuously transmit and receive the traffic, which belongs to the PDN connection permitted to move to the wireless LAN 1d-05, through the wireless LAN 1d-05 without being disconnected with the wireless LAN 1d-05 that is currently communicating (1d-25).

In addition, although not illustrated in the present drawings, if the terminal 1d-01 selects or reselects another base station in the RRC_IDLE state, the terminal 1d-01 may delete and release the setting depending on the movement instruction received in the step 1d-17 while no longer maintaining the setting. That is, the set control information may be deleted/released. Accordingly, if there is the traffic to the wireless LAN, the terminal 1d-01 accesses the corresponding another base station selected/reselected and is shifted to the RRC_CONNECTED, thereby transmitting and receiving the corresponding traffic.

Meanwhile, a scenario to allow the terminal 1d-01 to be shifted from the RRC_IDLE state in the state in which the setting depending on the movement instruction is made as in the step 1d-17 and allow the terminal 1d-01 to be shifted to the RRC_CONNECTED state by again accessing the corresponding base station 1d-03 (due to the generation of the traffic to the LTE, or the like) in the corresponding base station 1d-03 without moving the terminal 1d-01 to another base station (1d-31) may be considered (1d-33). At this point, the terminal 1d-01 may delete/cancel the setting depending on the movement instruction received in the step 1d-17 while no longer following the setting. That is, the configured control information may be deleted/released. Accordingly, if there is the traffic to the wireless LAN 1d-05, the terminal 1d-01 may transmit and receive all the corresponding traffics to and from the current base station 1d-03 (2d-35).

Figure 1E:
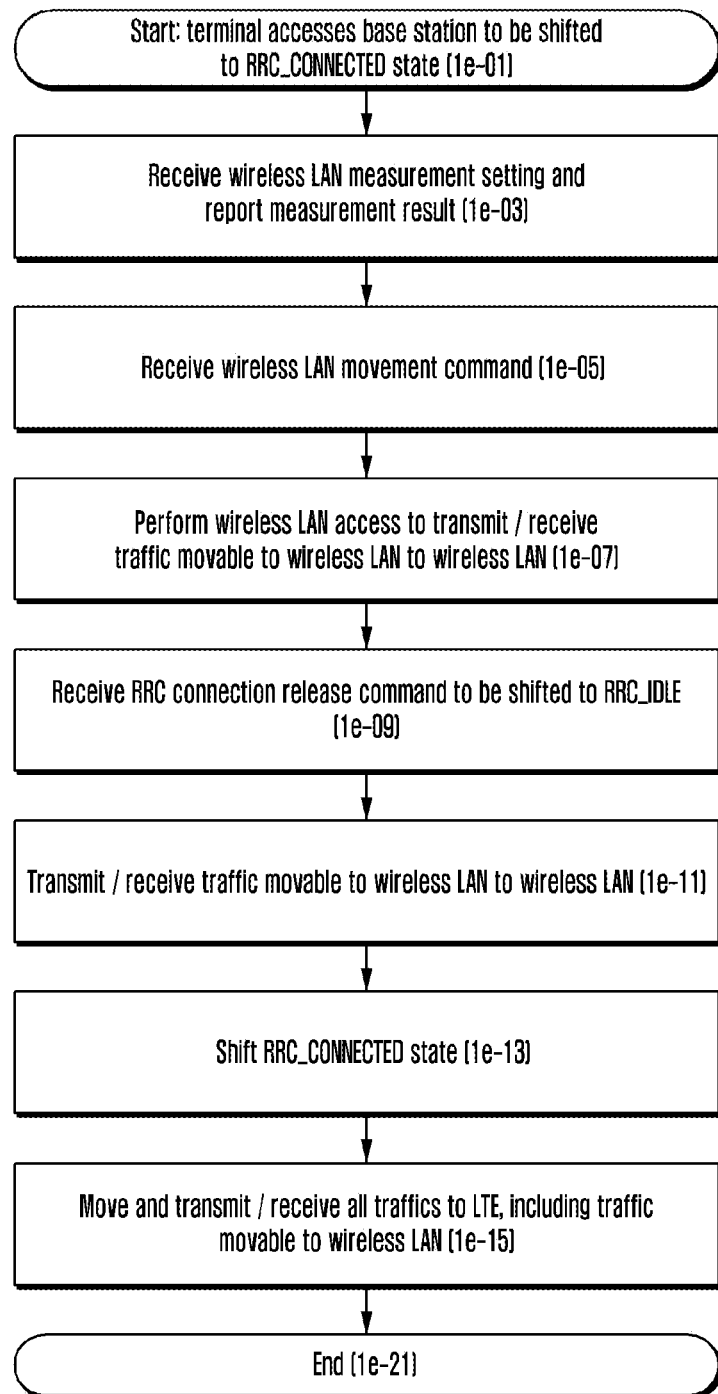
FIG. 1E is an exemplified diagram of an operation sequence of the terminal depending on the state shift of the terminal when the RCLWI technology according to the first embodiment of the present invention is applied.

FIG. 1E is an exemplary diagram of a terminal operation sequence depending on the state shift of the terminal (for example, 1c-11 of FIG. 1C, 1d-01 of FIG. 1D) when RCLWI according to the first embodiment of the present invention is applied.

It is assumed that the terminal is in the RRC_CONNECTED state in which it is connected to the base station (1e-01). In the RRC_CONNECTED state, the terminal may transmit and receive the control and user data messages to and from the base station.

Thereafter, the terminal is set to perform the measurement of the neighboring WLAN APs from the base station. The configuration information may include at least one of the information on which wireless LAN AP (or a set of APs) is to be measured and the report condition related configuration information on whether to report the measurement result to the base station under certain conditions. According to the configuration information, the terminal may perform the measurement of the neighboring WLAN APs and report the measurement result to the base station if the condition for reporting the configuration information is met (1e-03).

Thereafter, if the terminal receives the control information including an instruction to move traffic from the base station to the WLAN AP (or set of APs) (2e-05), the terminal may access the WLAN AP corresponding to the movement instruction to transmit and receive the traffic, which belongs to the PDN connection permitted to move to the wireless LAN among the set PDN connections, to and from the current terminal through the wireless LAN (1e-07). The control information or the movement instruction may include at least one wireless LAN identifier.

Thereafter, if the terminal receives the RRC connection release message from the base station, the terminal is shifted to the RRC_IDLE state (1e-09).

Even if the terminal is shifted to the RRC_IDLE state, the terminal continuously maintains the control information including the movement instruction received in the step 1e-05 to continuously transmit and receive the traffic, which belongs to the PDN connection permitted to move to the wireless LAN, through the wireless LAN without being disconnected with the wireless LAN that is currently communicating (1e-11).

In addition, although not illustrated in the present drawings, when the terminal moves by selecting or reselecting another base station in the RRC_IDLE state, the terminal may delete/release the setting while no longer following the setting depending on the movement instruction received in the step 1e-05. That is, the configured control information may be deleted/released. Accordingly, if there is the traffic to the wireless LAN, the terminal accesses the corresponding another base station selected/reselected and is shifted to the RRC_CONNECTED, thereby transmitting and receiving the corresponding traffic.

Meanwhile, if the terminal is shifted from the RRC_IDLE state in the state in which the setting depending on the movement instruction is made as in the step 1e-05 and again accesses the corresponding base station (due to the generation of the traffic to the LTE) in the corresponding base station without moving to another base station to be shifted to the RRC_CONNECTED state (1e-13), the terminal may delete/release the setting while no longer following the setting depending on the movement instruction received in the step 1e-05. That is, the configured control information may be deleted/released. Accordingly, if there is the traffic to the wireless LAN, the terminal may transmit and receive the corresponding traffic to and from the current LTE base station (1e-15).

Figure 1F:
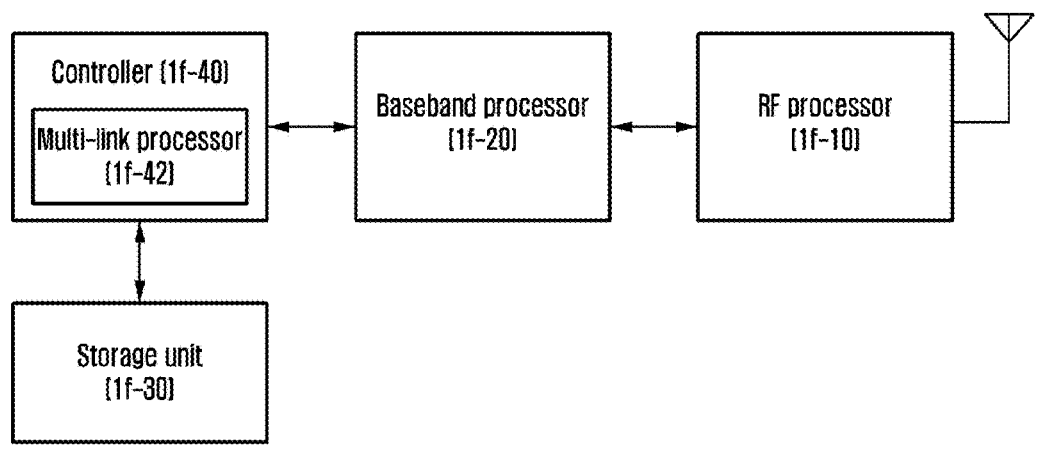
FIG. 1F is a block configuration diagram of the terminal in the wireless communications system according to the first embodiment of the present disclosure.

FIG. 1F is a block configuration diagram of the terminal in the wireless communications system according to the first embodiment of the present disclosure.

Referring to FIG. 1F, the terminal may include at least one of a radio frequency (RF) processor 1f-10, a baseband processor 1f-20, a storage unit 1f-30, and a controller 1f-40.

The RF processor 1f-10 serves to transmit and receive a signal through a radio channel, such as band conversion and amplification of a signal. That is, the RF processor 1f-10 up-converts a baseband signal provided from the baseband processor 1f-20 into an RF band signal and then transmits the RF band signal through an antenna and down-converts the RF band signal received through the antenna into the baseband signal. For example, the RF processor 1f-10 may include a transmitting filter, a receiving filter, an amplifier, a mixer, an oscillator, a digital to analog converter (DAC), an analog to digital converter (ADC), or the like. FIG. 1F illustrates only one antenna but the terminal may include a plurality of antennas. Further, the RF processor 1f-10 may include a plurality of RF chains. Further, the RF processor 1f-10 may perform beamforming. For the beamforming, the RF processor 1f-10 may adjust a phase and a size of each of the signals transmitted and received through a plurality of antennas or antenna elements.

The baseband processor 1f-20 performs a conversion function between a baseband signal and a bit string according to a physical layer standard of a system. For example, when data are transmitted, the baseband processor 1f-20 generates complex symbols by coding and modulating a transmitted bit string. Further, when data are received, the baseband processor 1f-20 recovers the received bit string by demodulating and decoding the baseband signal provided from the RF processor 1f-10. For example, according to an orthogonal frequency division multiplexing (OFDM) scheme, when data are transmitted, the baseband processor 1f-20 generates the complex symbols by coding and modulating the transmitted bit string, maps the complex symbols to sub-carriers, and then performs an inverse fast Fourier transform (IFFT) operation and a cyclic prefix (CP) insertion to configure the OFDM symbols. Further, when data are received, the baseband processor 1f-20 divides the baseband signal provided from the RF processor 1410 in an OFDM symbol unit and recovers the signals mapped to the sub-carriers by a fast Fourier transform (FFT) operation and then recovers the received bit string by the modulation and decoding.

The baseband processor 1f-20 and the RF processor 1f-10 transmit and receive a signal as described above. Therefore, the baseband processor 1f-20 and the RF processor 1f-10 may be implemented as physical components such as a transmitter, a receiver, a transceiver, and a communication unit. Further, at least one of the baseband processor 1f-20 and the RF processor 1f-10 may include a plurality of communication modules to support a plurality of different radio access technologies. Further, at least one of the baseband processor 1f-20 and the RF processor 1f-10 may include different communication modules to process signals in different frequency bands. For example, different radio access technologies may include the wireless LAN (for example: IEEE 802.11), a cellular network (for example: LTE), or the like. Further, the different frequency bands may include a super high frequency (SHF) (for example: 2.5 GHz, 5 GHz) band, a millimeter wave (for example: 60 GHz) band.

The storage unit 1f-30 stores data such as basic programs, application programs, and configuration information for the operation of the terminal. In particular, the storage unit 1f-30 may store information associated with a wireless LAN node that performs wireless communication using the wireless LAN access technology. Further, the storage unit 1f-30 provides the stored data according to the request of the controller 1f-40.

The controller 1f-40 controls the overall operations of the terminal. For example, the controller 1f-40 transmits and receives a signal through the baseband processor 1f-20 and the RF processor 1f-10. Further, the controller 1f-40 records and reads data in and from the storage unit 1f-40. For this purpose, the controller 1f-40 may include at least one processor. For example, the controller 1f-40 may include a communication processor (CP) performing a control for communication and an application processor (AP) controlling a higher layer such as the application programs. According to the embodiment of the present invention, the controller 1f-40 includes a multi-link processor 1f-42 that performs the processing to be operated in a multi-link mode. For example, the controller 1f-40 may control the terminal to perform the procedure illustrated in the operation of the terminal illustrated in FIG. 1.

For example, the controller 1f-40 according to the embodiment of the present invention may receive a wireless LAN measurement message from the base station to perform the measurement according to the corresponding configuration information and then report the measurement result to the base station. Further, the controller 1f-40 may determine whether to transmit and receive the traffic to the LTE or transmit and receive the traffic to and from the wireless LAN according to the instruction from the LTE base station and the state shift of the terminal to perform the control.

For example, the controller 1f-40 may receive the control information for establishing interworking with the wireless LAN from the base station in a cellular connection state and may transmit and receive at least a portion of the traffic to and from the first wireless LAN based on the information in the cellular connection state. The controller 1f-40 may transmit and receive at least a part of the traffic to and from the first wireless LAN based on the control information even when the cellular connection state is released. The control information may include at least one wireless LAN identifier for the interworking.

In addition, if the cellular connection state is released and then reconnected, the controller 1f-40 may stop the wireless LAN interworking operation by releasing the control information.

The controller 1f-40 may receive the wireless LAN configuration information prior to receiving the control information from the base station and may perform the measurement based on the wireless LAN measurement configuration information and report the measurement result to the base station.

Second Embodiment

The present invention relates to a method and apparatus for performing semi-persistent scheduling in an LTE terminal that supports vehicle-to-vehicle (V2V) communication in a mobile communication system. Although the present specification describes, by way of example, the LTE terminal, it is well known to those skilled in the art that the present embodiment is applicable not only to LTE but also to terminals using other wireless communications in addition to 5G.

The V2V basically depends on a structure and an operation principle of Rel-12 device-to-device (D2D). Like the D2D, data are transmitted and received between vehicle terminals (hereinafter, referred to as terminals) even in the V2V, but more terminals will be serviced in a cell supporting the V2V than in the D2D, and therefore, there is a need to reduce waste of radio resources. In particular, in the case of mode 1 in which a base station assigns and manages resources for V2V, if a RRC-connected terminal has data to be transmitted to another terminal, an MAC control element (hereinafter, referred to as CE) may be transmitted to the base station. The MAC CE may be, for example, a buffer status report MAC CE in a new format (including indicator that notifies at least a buffer status report for V2V communication and information on a size of data that are buffered for D2D communication). The detailed format and content of the buffer status report used in the 3 GPP refer to 3 GPP standard TS36.321 "E-UTRA MAC Protocol Specification". As described above, the base station receiving the V2V communication request signals additional configuration/setting information (V2V resource block assignment information, modulation and coding (MCS), and timing advance (TA)) or V2V communication permission indicator for the V2V communication, such that the terminal may perform permission/control/management to perform the V2V communication.

If the resource block assignment based on the dynamic scheduling request (D-SR) as described above is applied to the V2V, a very large amount of radio resources may be required. This may be seen from two characteristics of the scenario considered in the V2V. The first characteristic is that the number of terminals in a service area expected in the V2V is larger than in the D2D. The second characteristic is that basic safety information (BSM) including a position and a traveling state of the V2V terminal needs to be transmitted in a short period because safety is considered to be the top priority in the case of the V2V terminal. That is, if the dynamic scheduling defined in D2D mode 1 is applied as it is, a collision or a deficiency of resources is likely to occur in the request and assignment of resources for the V2V.

In the present embodiment, to solve the above problem, a method (request/setting/release) and components for semi-persistent scheduling (SPS) on resource block assignment in the V2V operated in the mode 1 are defined.

Meanwhile, sidelink (SL) communication in the V2V, that is, the vehicle-to-vehicle communication is operated based on a transmission resource defined in the D2D. As described above, since more vehicle terminals will be serviced in the cell supporting the V2V than in the D2D, there is a need to efficiently manage transmission resources. If the terminal transmits the geographical location information received through the global positioning system (GPS) to the base station, the base station may assign transmission resources to reduce the collision of the transmission resources between neighboring terminals using the information. That is, it is possible to improve resource block assignment efficiency in the V2V by mapping between the geographical location information and the sidelink transmission resources. In case of the terminal operated in mode 2, the terminal may directly apply the mapping between the geographical location information and the transmission resources according to a predetermined mapping rule and in case of the terminal operated in the mode 1, the terminal reports the geographical location information to the base station and then the base station may assign resources.

In the present embodiment, to avoid the collision of the sidelink transmission resources between the V2V terminals operated in the mode 1 and to efficiently assign resources using the geographical location information, a new method of reporting geographical location information to a base station is defined.

Figure 2A:
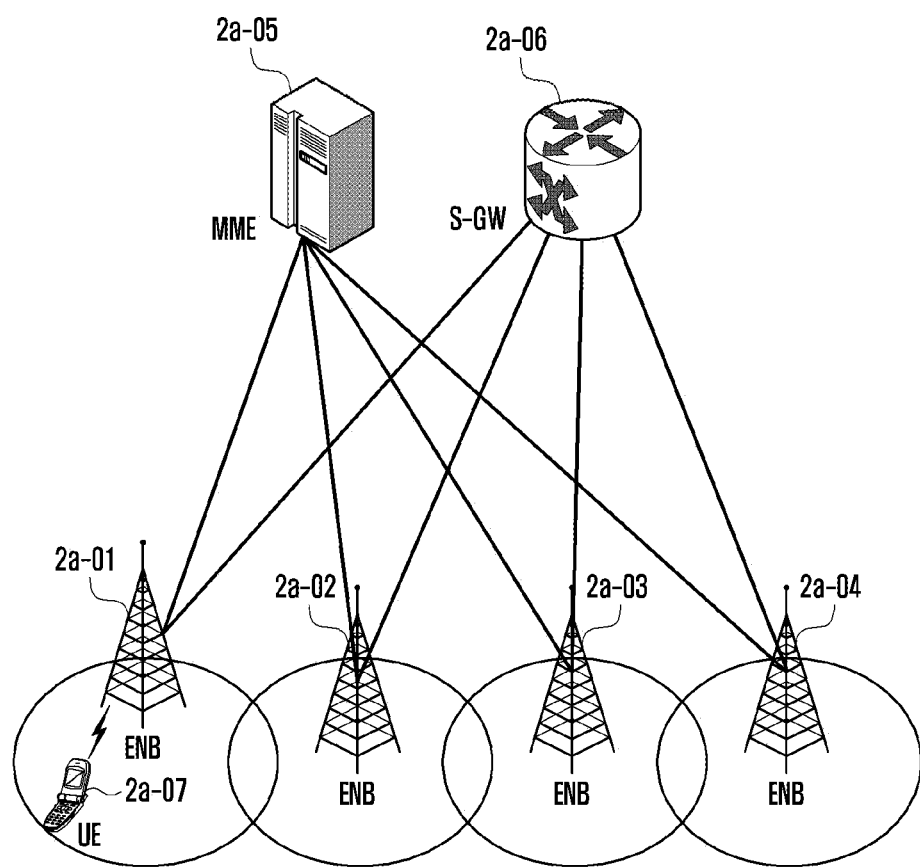
FIG. 2A is a diagram illustrating an example of the network structure of the wireless communication system to which the present invention is applied.

FIG. 2A is a diagram illustrating a structure of an LTE system that is an example of a wireless communication system.

Referring to FIG. 2A, the wireless communication system is configured to include a plurality of base stations (eNB) 2a-01, 2a-02, 2a-03, and 2a-04, a mobility management entity (MME) 2a-05, and a serving-gateway (S-GW) 2a-06.

A user equipment 2a-07 is connected to the external network through the base stations 2a-01 to 2a-04 and the S-GW 2a-06.

The base stations 2a-01 to 2a-04 are access nodes of a cellular network and provides a radio access to the terminals that are connected to the network. That is, in order to serve traffic of users, the base stations 2a-01 to 2a-04 collect and schedule state information such as a buffer state, an available transmission power state, and a channel state of the terminals to support the connection between the terminals and the core network (CN). The MME 2a-25 is an apparatus for performing various control functions as well as the mobility management function for the terminal and is connected to a plurality of base stations, and the S-GW 2a-06 is an apparatus for providing a data bearer. Further, the MME and the S-GWs 2a-05 and 2a-06 may further perform authentication, bearer management, etc., on the terminal connected to the network and may process packets that are to be received from the base stations 2a-01 to 2a-04 and are to be transmitted to the base stations 2a-01 to 2a-04.

Figure 2B:
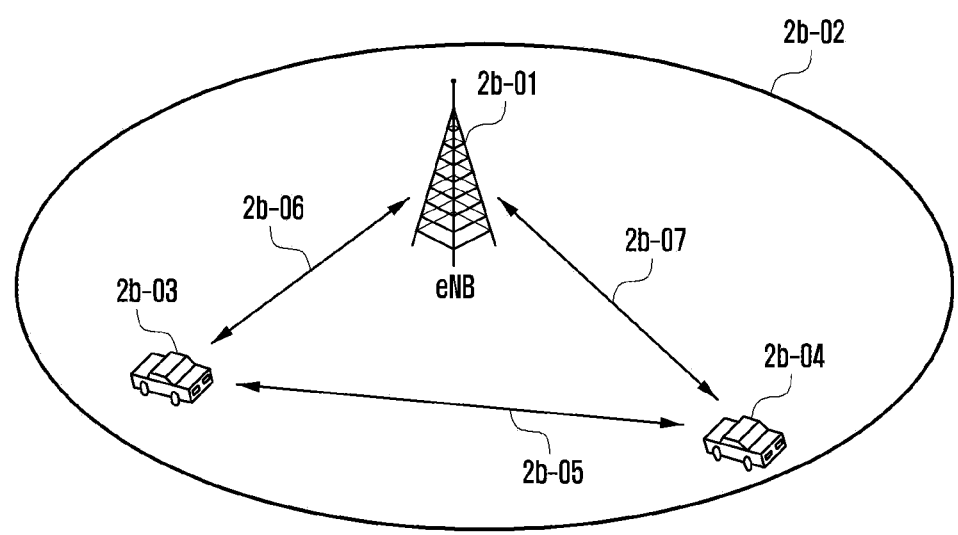
FIG. 2B is a diagram for explaining vehicle-to-vehicle (V2V) communication.

FIG. 2B is a diagram for explaining V2V communication. Specifically, FIG. 2B illustrates an example of performing the V2V communication in the cellular system.

The base station 2b-01 manages at least one of the terminals 2b-03 and 2b-04 located in a cell 2b-02 managed by the base station 2b-01. The first terminal 2b-03 of the terminals 2b-03 and 2b-04 performs the cellular communication using a link 2b-06 between the base station 2b-01 and the first terminal-base station 2b-06 and the second terminal 2b-04 performs the cellular communication using a link 2b-07 between the base station 2b-01 and the second terminal-base station. If the first terminal 2b-03 and the second terminal 2b-04 perform the V2V communication, the first terminal 2b-03 and the second terminal 2b-04 may directly transmit and receive information to and from each other via a V2V link 2b-05 without passing through the base station 2b-01. The number of terminals receiving the V2V service in one cell may be many and the relationship between the base station 2b-01 and the terminals 2b-03 and 2b-04 as described above may be extended and applied.

Figure 2C:
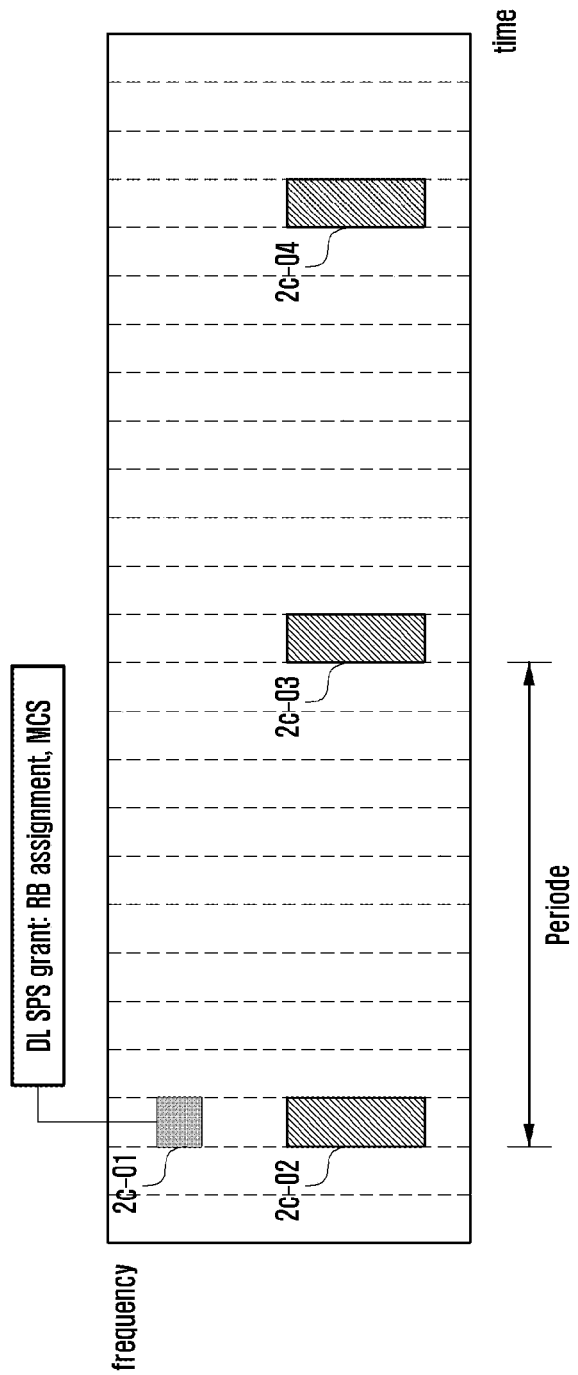
FIG. 2C is a diagram for explaining a semi-persistent scheduling (SPS) operation in the LTE.

FIG. 2C is a diagram for explaining the semi-persistent scheduling (SPS) operation in the LTE system.

In the LTE system, the SPS is a method used for scheduling services where small data is frequently generated, which is required to reduce the amount of control information increased in proportion to the number of users and secure system capacity for user data transmission. That is, the SPS is a method for once transmitting uplink/downlink resource block assignment control information 2c-01 to the terminal and performing, by the base station and the terminal, an operation for data 2c-02 to 2c-04 generated later depending on the transmitted control information. That is, according to the SPS in the LTE system, one transmission resource for MAC PDU transmission may be assigned every period. The resources assigned by the control information are valid until SPS activation or SPS deactivation/release is generated. The SPS operation for the downlink in the LTE system is as follows.

1. The base station may set the SPS operation in the terminal using the RRC message. The RRC message may include SPS C-RNTI, an SPS period (semiPersistSchedIntervalDL), a maximum number (numberOfConfSPS) of an HARQ processes for the SPS, or the like.

2. If the SPS is set for the downlink, the base station may transmit, to the terminal, downlink control information (DCI) format 1/1A/2/2A/2B/2C including the downlink resource block assignment control information 2c-01 as the SPS C-RNTI of the physical downlink control channel (PDCCH). The DCI may include an assignment type (FDD/TDD), an MCS level, a new data indicator (NDI), a redundancy version (RV), an HARQ process number, and resource block assignment information of data.

Figure 2D:
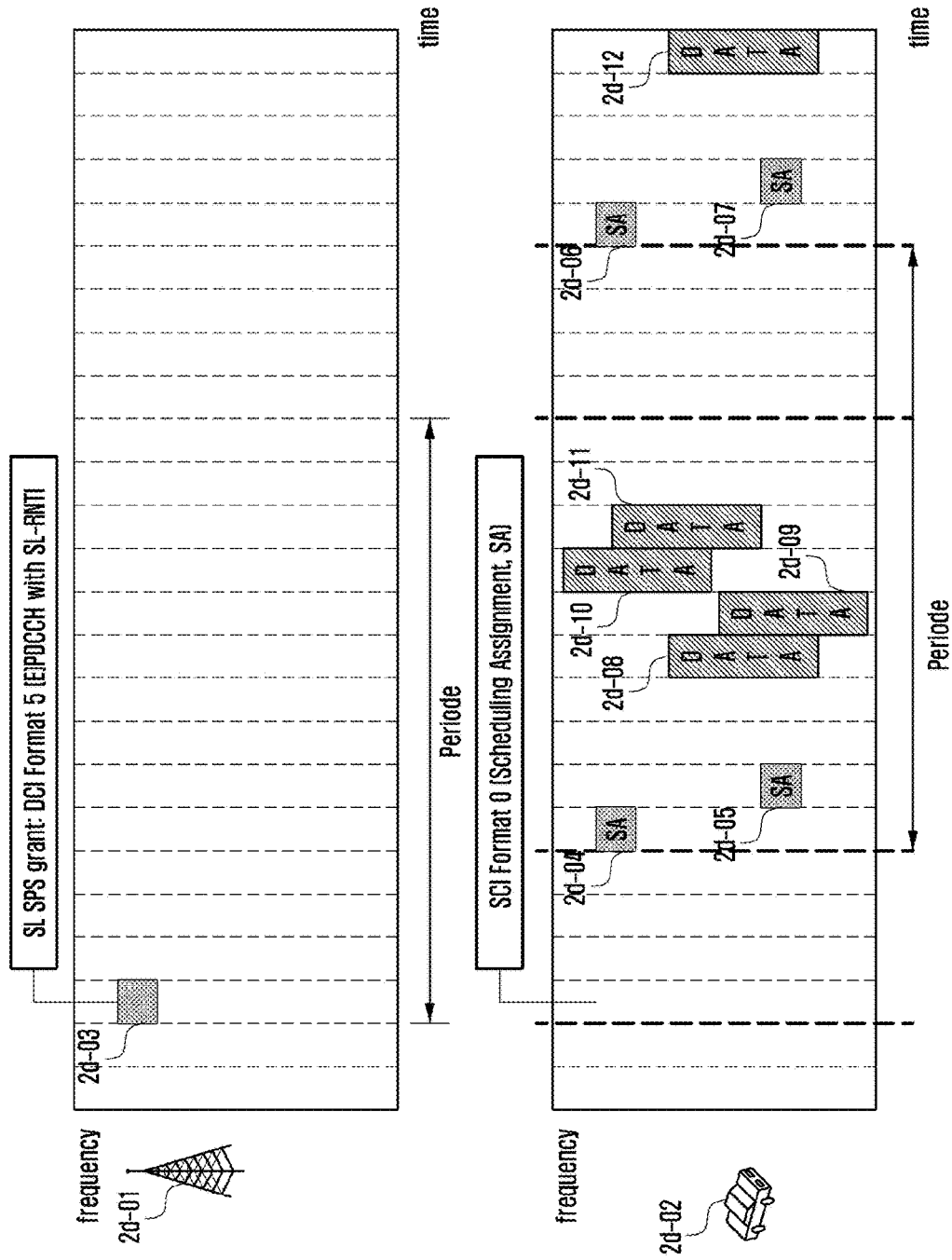
FIG. 2D is a diagram for explaining an SPS operation in V2V according to a second embodiment of the present invention.

FIG. 2D is a diagram for explaining an SPS operation in V2V according to a second embodiment of the present invention.

In case of the terminal 2d-02 supporting the V2V, it is expected that a larger number of data are frequently generated in a service area. That is, if the dynamic scheduling, which is the existing Rel-12 D2D resource block assignment method, is applied, the generation of the resource block assignment control information is increased, thus resources for transmitting user data will be reduced. If the SPS is used in the V2V, the base station 2d-01 may once transmit, to o the terminal 2d-02, the resource block assignment control information 2d-03 of the sidelink that is an inter-terminal link, and the base station and the terminal may perform the SPS operation for scheduling assignment (SA) 2d-04, 2d-05, 2d-06, and 2d-07 and data 2d-08, 2d-09, 2d-10, 2d-11, and 2d-12 that are generated later depending on the transmitted control information. Here, the number of transmissions of the SAs 2d-04 to 2d-07 and the data 2d-08 to 2d-12 is a predetermined value and may be one or more. That is, according to the SPS in the V2V, one or more transmission resource for transmission of the SAs 2d-04 to 2d-07 and the data 2d-08 to 2d-12 may be assigned every period. Further, the resources assigned by the control information are valid until SPS activation or SPS deactivation/release is generated. Compared with the existing SPS, in the existing SPS, one transmission resource is implicitly assigned in a predetermined period, and the transmission resource is for L2 transmission (or MAC PDU transmission), whereas in the SPS in the V2V, one or more transmission resource is implicitly assigned in a predetermined period and the transmission resource may be one for the SA transmission that is an L1 signal.

Figure 2E:
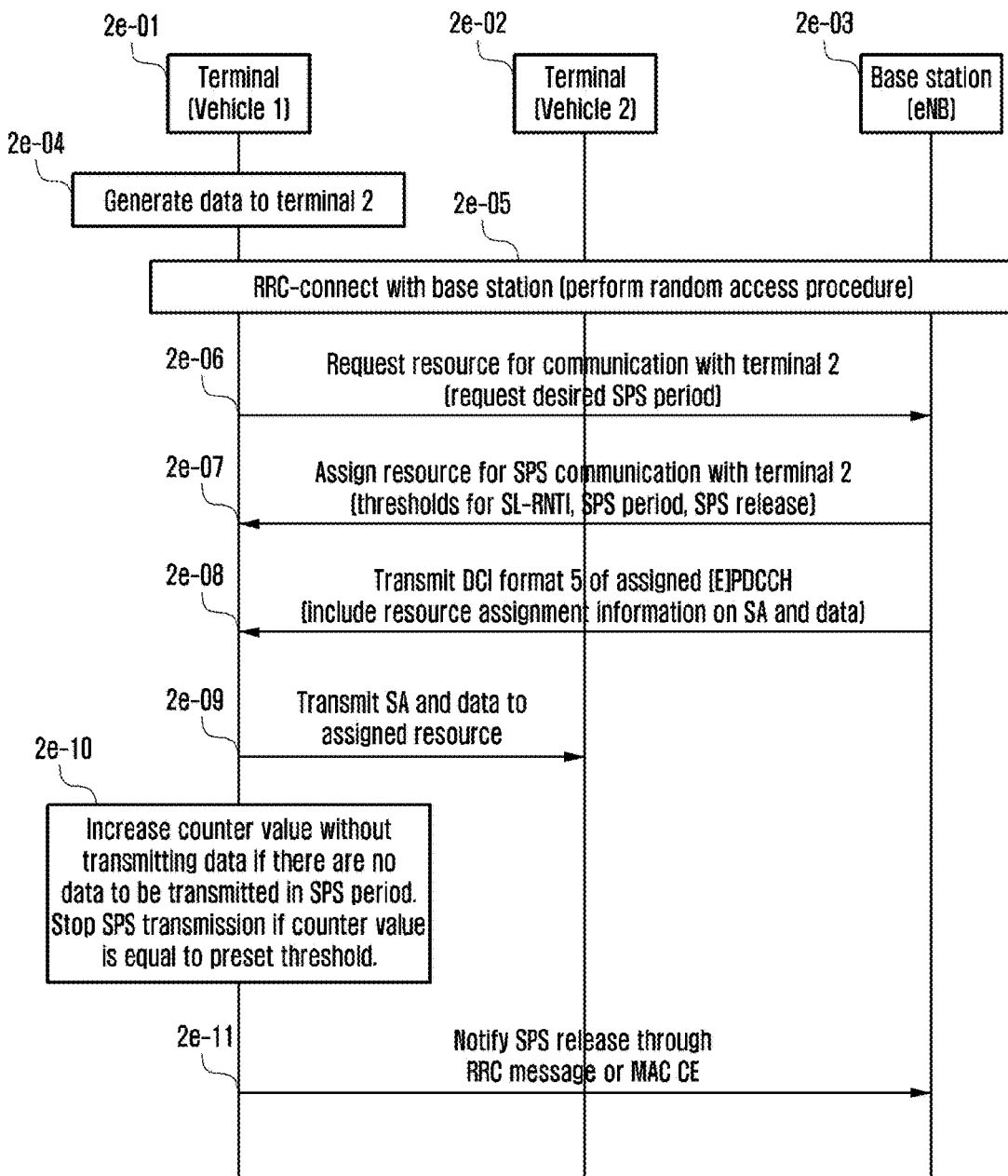
FIG. 2E is a diagram illustrating the overall operation of a terminal and a base station when the SPS is set in the V2V according to the second embodiment of the present invention.

FIG. 2E is a diagram illustrating the overall operation of a terminal and a base station when the SPS is set in the V2V according to the second embodiment of the present invention.

In step 2e-04, in terminal 1 2e-01, data are generated to terminal 2 2e-02. In step 2e-05, the terminal 1 2e-01 performs the RRC connection with the base station 2e-03 for vehicle communication with another terminal 2 2e-02, and then in step 2e-06, may transmit a resource request message for vehicle-to-vehicle communication to the base station 2e-03. The resource request message transmitted to the base station 2e-03 by the RRC signaling includes information that may assist the SPS setting of the base station, for example, SPS period information, SPS time offset information, MAC PDU size information of the terminal 1 2e-01, and the like. For example, the terminal 2e-01 may determine the period information that the terminal wants on the basis of a type and a generation frequency of information that the terminal intends to transmit through the SPS resource.

In step 2e-07, the base station 2e-03 receiving the resource request message may transmit a setting message for setting up the SPS operation for the V2V terminal 1 2e-01. For example, the base station 2e-03 may transmit, to the terminal 1 2e-01, thresholds for an SL-RNTI, an SPS period, and an SPS release associated with at least one SPS setting through the setting message transmitted by the RRC signaling.

In step 2e-08, the base station 2e-03 may transmit, to the terminal 2e-01, DCI Format 5 as the SL-RNTI of the (E)PDCCH for the SPS activation. The DCI may include information that instructs each SPS to be activated when a plurality of SPSs are set. The DCI may include the resource block assignment information of the SA and the data.

In step 2e-09, the terminal 1 2e-01 may transmit the SA and the data to the terminal 2 2e-02 as the assigned resources, on the basis of the information and the DCI that are included in the received setting message and the DCI. If there is no data to be transmitted in the SPS period set by the terminal 1 2e-01, no data are transmitted and a counter value is increased. In step 2e-10, if the counter value becomes equal to a predetermined threshold, the terminal 1 2e-01 may stop the SPS transmission.

In step 2e-11, the terminal 1 2e-01 may notify the base station 2e-03 of the SPS release through the RRC message or the MAC CE. In other words, the release information on the SPS use of the sidelink may be included in the existing RRC message or a new type of RRC message. Alternatively, it may be transmitted using a new MAC CE. The base station 2e-03 may directly instruct the SPS release to the terminal 1 2e-01.

In other words, as the method of releasing the V2V SPS, there are explicit methods (method by the command of the base station and a method in which the base station instructs the terminal to release the SPS through the PDCCH) and an implicit method (method for releasing, by the terminal itself, the SPS transmission resource by continuously generating an event in which no data are transmitted through the SPS transmission resource by a predetermined frequency or continuously generating an event in which the MAC PDU that does not receive predetermined information through the SPS transmission resource is transmitted by a predetermined frequency, in which the predetermined information may be, for example, an MAC SDU transmitted from the higher layer of the MAC to the MAC layer). If the SPS is released by the explicit methods, the terminal may not transmit, to the base station, a layer 2 control message (MAC CE) or a layer 3 control message (RRC message) notifying that the SPS is released. On the other hand, if the SPS is released by the implicit method, the terminal may transmit, to the base station, the layer 2 control message (MAC CE) or the layer 3 control message (RRC message) notifying that the SPS is released.

Figure 2F:
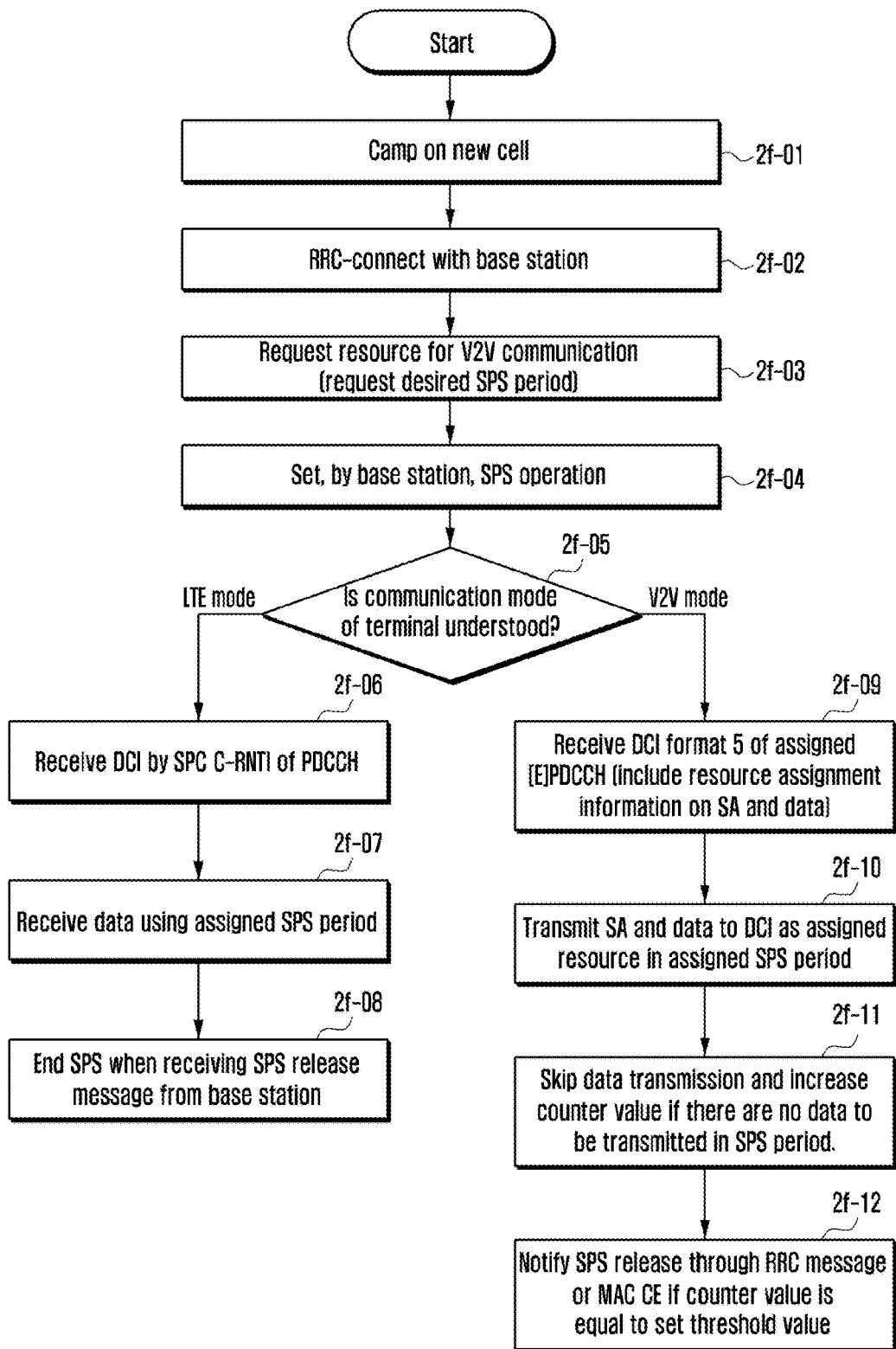
FIG. 2F is a diagram illustrating an operation of the terminal when the SPS setting is received from the base station according to the second embodiment of the present invention.

FIG. 2F is a diagram illustrating an operation of the terminal 2e-01 when the SPS establishment is received from the base station according to the second embodiment of the present invention.

In step 2f-01, the terminal supporting both the LTE and the V2V camps on a new cell. In step 2f-02, the terminal may perform the RRC connection with the base station, and in step 2f-03, the terminal may transmit the resource request message for the V2V communication through the RRC message. The terminal may transmit the information that may assist the SPS setting of the base station, for example, the SPS period information, the SPS time offset information, the MAC PDU size information, or the like by including them in the resource request message transmitted to the base station 2e-03 by the RRC signaling.

In step 2f-04, the base station may set the SPS operation for the LTE and the V2V. The thresholds for the SL-RNTI, the SPS period, and the SPS release associated with at least one SPS setting may be transmitted to the terminal through the setting message transmitted by the RRC signaling. In step 2f-05, the terminal may ascertain its own operation mode.

If the terminal is operating in the LTE mode, it receives the DCI as the PDCCH for activating the SPS set in step 2f-06 and may receive data from the base station using the SPS period assigned in step 2f-07. In step 2f-08, if the SPS release message is received from the base station, the SPS operation may end.

If the terminal is operated in the V2V mode, the terminal receives the DCI format 5 of the (E)PDCCH for activating the SPS set in step 2f-9. The DCI may include information that instructs each SPS to be activated when a plurality of SPSs are set. The DCI may include the resource block assignment information of the SA and the data in the sidelink. In step 2f-10, the terminal may transmit, as resources received from the DCI according to the assigned V2V SPS period, the SA and the data to other terminals. In step 2f-11, if there are no data to be transmitted in the V2V SPS period, the terminal may omit the transmission of the SA and the data and increase the counter value. In step 2f-12, if the counter value is equal to a preset threshold, the terminal notifies the base station of the SPS release through the RRC message or the MAC CE.

Meanwhile, in order to perform the V2V SPS operation, information such as the resource block assignment information, the SPS period, a transport format (transport block size, MCS, or the like) to be applied, SPS start timing, or the like is required. Some of the information may be transmitted through an L3 unicast control message (for example, RRC message) and the remaining information may be transmitted through L1 control information (for example, DCI information transmitted through the PDCCH).

As described with reference to FIG. 2F, the resource block assignment information and the transmission format information may be transmitted through the L1 signal. The SPS start timing may be determined based on timing when the L1 signal including the control information related to the SPS is received. For example, if the L1 signal is received at arbitrary timing t1, the SPS transmission resource may be assigned (or becomes available) at timing specified by 't1+n*SPS period+predetermined constant'. In the above equation, n is an integer that monotonically increases by one, including zero.

The remaining information other than the information, for example, the SPS period information, may be transmitted to the terminal through an L3 unicast control message.

In another operation of the V2V SPS according to various embodiments, a method for ascertaining, by the terminal, transmission resources that are not currently used by allowing the terminal to sense (predetermined operation for determining which transmission resource is being used) and semi-persistently using the transmission resources in a predetermined period may be considered. It is advantageous in that the operation is applicable even to a terminal that does not have an RRC connection due to a terminal-oriented operation.

The information required for the modified V2V SPS operation may be transmitted from the base station to the terminal as described below or may be determined by the base station itself.

SPS period information, transmission format information, implicit release related information (e.g., counter): It may be known to the terminals that wants to use the V2V SPS through a broadcast control message (e.g., system information), i.e., a predetermined SIB.

SPS transmission resource information: The terminal may determine the transmission resources to be used, among the transmission resources that are not used through sensing.

SPS start timing: The terminal may set the timing when the transmission resource is determined by the sensing as the start timing and transmit the SA through the selected transmission every SPS transmission period (without another sensing).

In order to prevent a terminal from exclusively using a transmission resource for a very long period of time when the terminal itself selects the SPS resource as described above, a period during which the terminal may exclusively use the SPS resource once selected, the number of SAs, or the like that may be transmitted through the transmission resource, or the like is set by the base station to be known to the terminals. The information may be referred to as a valid period.

The operation of the terminal using the modified V2V SPS is as follows.

When the terminal camps on an arbitrary cell, it may acquire predetermined system information and acquire the information required for the V2V SPS transmission described above.

When the terminal generates data to be transmitted using the V2V SPS, the terminal performs sensing on a transmission resource pool for V2V, and if the available transmission resource is found as a result of the sensing, the terminal may decide to use the transmission resource. The terminal may determine the available timing of the transmission resource as the timing when it is repeatedly generated every SPS period based on the timing when the transmission resource is decided to be available or the first timing when data are transmitted through the transmission resource.

The terminal may drive a valid period timer at the timing when the SPS transmission resource is used for the first time or the timing when the SPS transmission resource is specified. Alternatively, if the SPS transmission resource is used, the valid period counter may be increased by 1.

The terminal may transmit data using the SPS transmission resource and then may release the SPS transmission resource if the valid period timer expires or the valid period counter reaches a predetermined value. The terminal waits for a predetermined period of time before selecting a new SPS transmission resource, in which the waiting period may be provided as system information.

Figure 2G:
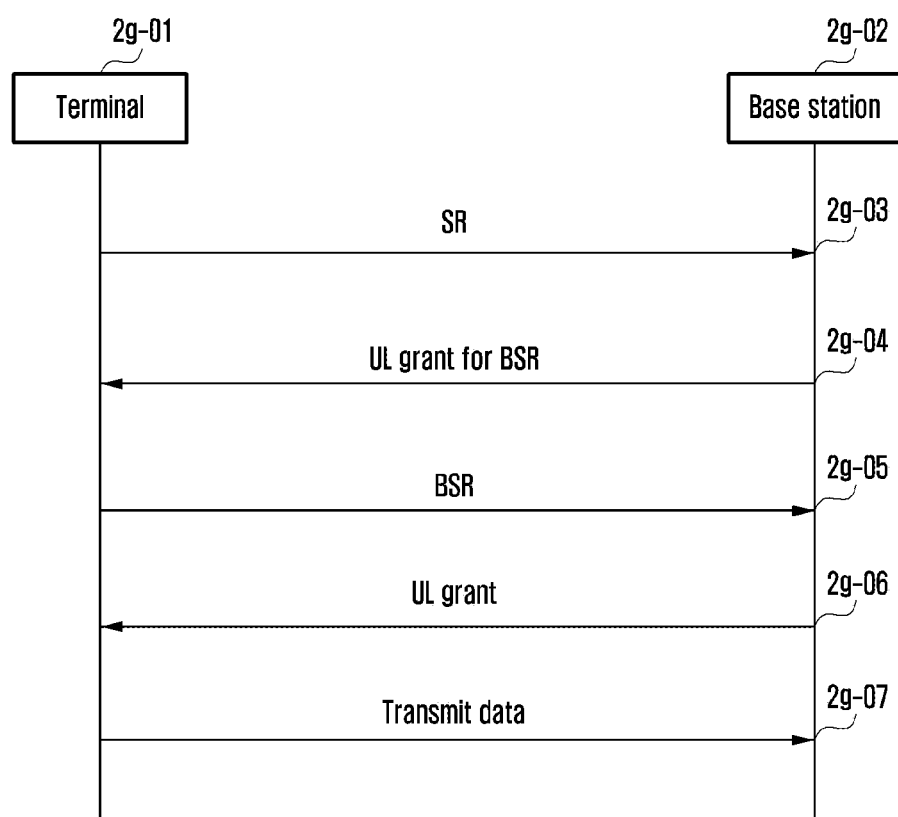
FIG. 2G is a diagram illustrating a scheduling request (SR) procedure for an LTE terminal.

FIG. 2G is a diagram illustrating a scheduling request (hereinafter, SR) procedure of the terminal in the LTE terminal.

In step 2g-03, a terminal 2g-01 may notify a base station 2g-02 that data to be transmitted to the base station 2g-02 are generated and transmit the SR to be assigned resources for a buffer state report. A regular BSR is generated if the MAC CE is transmitted in the existing LTE and the SR needs to be triggered to be assigned the transmission resources. Here, the regular BSR is transmitted if new data reaches an uplink buffer and a priority of the new data is higher than the data that is waiting in the buffer.

In step 2g-04, the base station 2g-02 may transmit an UL grant for the BSR to the terminal 2g-01. In step 2g-05, the terminal 2g-01 may code the amount of data to be transmitted to the base station 2g-02 with a buffer size of a predetermined logical channel group (LCG) and transmit the coded data. In step 2g-06, the base station 2g-02 may transmit an UL grant based on the BSR received from the terminal 2g-01. In step 2g-07, the terminal may transmit data to the base station through the assigned UL grant.

Figure 2H:
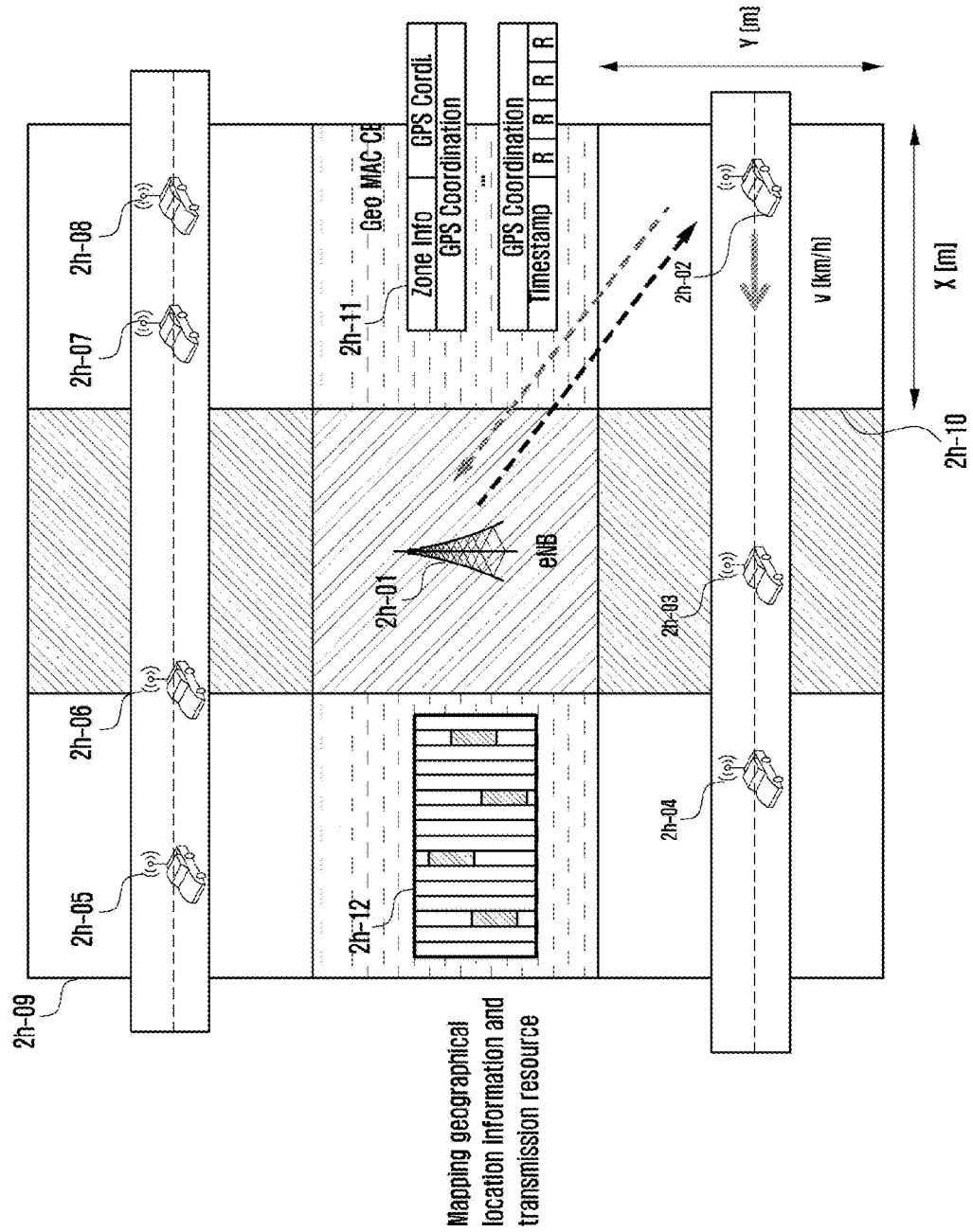
FIG. 2H is a diagram illustrating an operation of allowing the V2V terminal according to the second embodiment of the present invention to transmit geographical location information and allowing the base station to assign resources.
Figure 21:
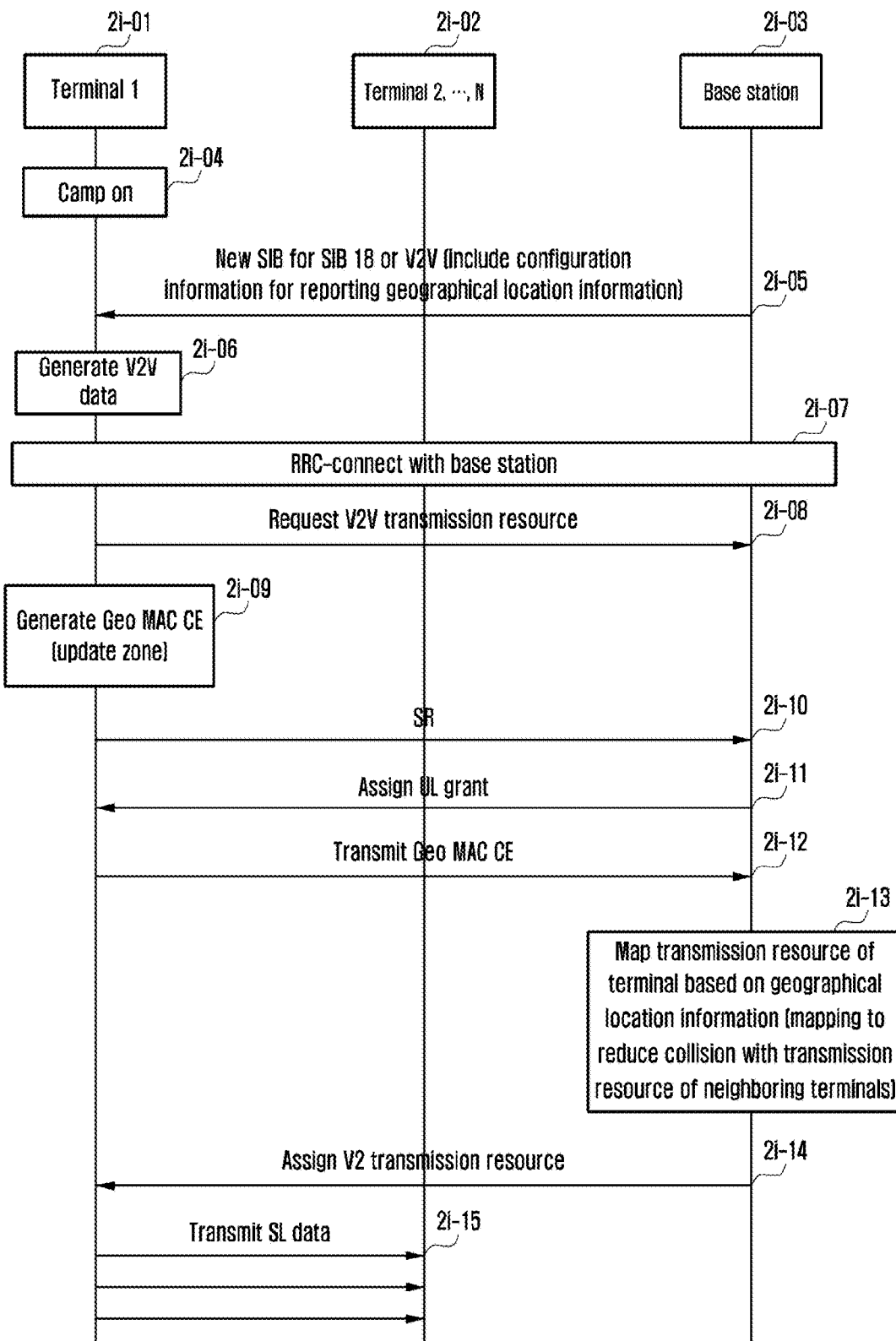

FIG. 2H is a diagram illustrating an operation of allowing the V2V terminal according to the second embodiment of the present invention to transmit geographical location information and allowing the base station to assign resources.

According to the present embodiment, a base station 2h-01 may assign transmission resources based on geographical location information of terminals 2h-02 to 2h-08 in order to reduce the collision of the transmission resources between terminals 2h-02 to 2h-08 located in a cell 2h-09 (2h-12). For example, different transmission resources may be assigned to geographically neighboring and the same transmission resources may be assigned to distant terminals. It is presumed that the data transmitted by the terminal in the V2V communication is for broadcasting to neighboring terminals within a predetermined radius.

Basically, the terminals 2h-02 to 2h-08 may directly report the geographical location information received via the GPS or report information indicating the geographical area divided based on a GPS position within a cell 2h-09 zone Information, that is, zone (2h-10) index information.

As can be seen in 2h-11, the geographical location information that the terminal transmits may be transmitted to a new geographical MAC CE (hereinafter, Geo MAC CE) and the control signal includes GPS coordination information, zone index information, timestamp (time when GPS information is acquired), and the like. The zone 2h-10 may be defined by the GPS position of the base station and the size information of the zone (e.g., horizontal length X [m] and vertical length Y [m]). The base station may transmit, as the system information block (SIB), zone configuration information (zone size information, the number of zones in the cell, and the like) to the terminal.

FIG. 2I is a diagram illustrating a process of assigning sidelink resources using the geographical location information in the V2V according to the second embodiment of the present invention.

A terminal 1 2i-01 supporting the V2V operated in mode 1 needs to be assigned transmission resources from a base station 2i-03 in order to transmit and receive exchange data to and from another terminal 2i-02 through the sidelink.

The terminal 1 (2i-01) camping on in step 2i-04 may receive the SIB for the V2V from the base station in step 2i-05. At this point, the SIB for the V2V may be used by extending the existing SIB18 or by defining a new SIB. In addition to the information (transmission/reception resources and synchronization configuration information) included in the existing SIB 18, a geographical location information reporting period, zone size information (for example, horizontal length X[m], vertical length Y[m]), and configuration information for reporting geographical location information such as the number of zones present in the cell may be included.

In step 2i-06, the terminal 1 2i-01 may perform the RRC connection with the base station 2i-03 when data to be transmitted to another terminal 2i-02 through the sidelink are generated. Conversely, data to be transmitted from the terminal 1 2i-01 in the RRC connection state to another terminal 2i-02 may be generated.

In step 2i-08, the terminal 1 2i-01 may request a transmission resource to a base station 2i-03 through a SidelinkUEInformation message. The message may include an indicator for indicating whether to report the Geo MAC CE and a report period.

In step 2i-09, the terminal 1 2i-01 may generate the Geo MAC CE based on the geographical location information received through the GPS in order to assist the resource block assignment of the BS. The control signal may include the GPS coordinate information, the zone index information, the timestamp (time when the GPS information is acquired), and the like. The MAC CE of the existing LTE consists of information that is generated (for example, BSR) generated in the MAC or transmitted from a lower layer (for example, power headroom report), whereas the Geo MAC CE may consist of information transmitted from a higher layer. Among the information included in the Geo MAC CE, the GPS coordinate information and the timestamp information are acquired by the GPS module of the terminal and transmitted to the MAC via the RRC, and the zone index information may be acquired by the RRC of the terminal through the system information and then transmitted to the MAC.

In order for a terminal to transmit the Geo MAC CE, the SR is triggered and thus there is a need to be assigned the transmission resources. However, according to current LTE procedure, only the regular BSRs trigger the SR. In other words, conventionally, the MAC CE, which consists of the information transmitted from other layers, does not trigger the SR. In the embodiment, in order to transmit the Geo MAC CE to the base station at an appropriate time, it is defined that the SR is triggered if the Geo MAC CE is generated. That is, if the MAC CE generated by using the information transmitted from the lower layer or the higher layer other than the MAC layer is generated, the terminal may check the type of the MAC CE to determine whether the SR is triggered. The terminal triggers the SR if the MAC CE is the Geo MAC CE and does not trigger the SR if the MAC CE is another MAC CE (e.g., PHR MAC CE or C-RNTI MAC CE, or the like). Alternatively, if the MAC itself determines whether the MAC CE is triggered (existing MAC CEs such as the regular BSR and PHR are included here), the type of the MAC CE is checked to determine whether or not the SR is triggered and the SR may be triggered regardless of the type when the trigger of the MAC CE is determined by the higher layer (Geo MAC CE corresponds thereto).

Once the existing MAC CE is generated, the existing MAC CE is not discarded until it is transmitted. However, the need for the previous Geo MAC CE disappears in the moment new Geo MAC CE is generated based on new location information. Therefore, when the Geo MAC CE is triggered, the terminal checks whether there is a Geo MAC CE that has not yet been transmitted and discards the previous Geo MAC CE, such that only the new Geo MAC CE is transmitted, instead of transmitting the previous Geo MAC CE and the new Geo MAC CE together.

Based on the characteristics, the terminal 1 2*i*-01 transmits the SR to the base station 2*i*-03 in step 2*i*-10 and is assigned the UL grant from the base station 2*i*-03.

In step 2*i*-12, if the size of the uplink grant is sufficient for the transmission of the Geo MAC CE, the Geo MAC CE may be transmitted, and if the size of the uplink grant is insufficient for the transmission of the Geo MAC CE, the BSR may be transmitted. At this point, the terminal 1 2*i*-01 may code the amount of data of the Geo MAC CE with the buffer status or the buffer size of the predetermined LCG and transmit the data. The base station may use the RRC control message to set which BS of the LCG the Geo MAC CE is included in the terminal or may apply an implicit rule. The rule may be, for example, a rule for considering data of a logical channel/logical channel group having a highest priority among logical channels/logical channel groups set in the terminal and including the data in the BS of the LCG. Alternatively, a rule for considering the predetermined logical channel, for example, data of a signaling radio bearer (SRB) 1 and including it in the base station of the LCG of the SRB 1 may also be applied.

In step 2*i*-13, the base station 2*i*-03 may assign the transmission resources of the terminal 1 2*i*-01 so as to reduce the collision with the transmission resources of neighboring terminals 2*i*-02 based on the received Geo MAC CE information and in step 2*i*-14, the base station 2*i*-03 may transmit the assigned transmission resource to the terminal 1 2*i*-01. The transmission resource block assignment may be performed by the RRC reconfiguration message, for example. In step 2*i*-15, the terminal 1 2*i*-01 may transmit sidelink data to other terminals 2*i*-02 through the assigned transmission resources.

Figure 2J:
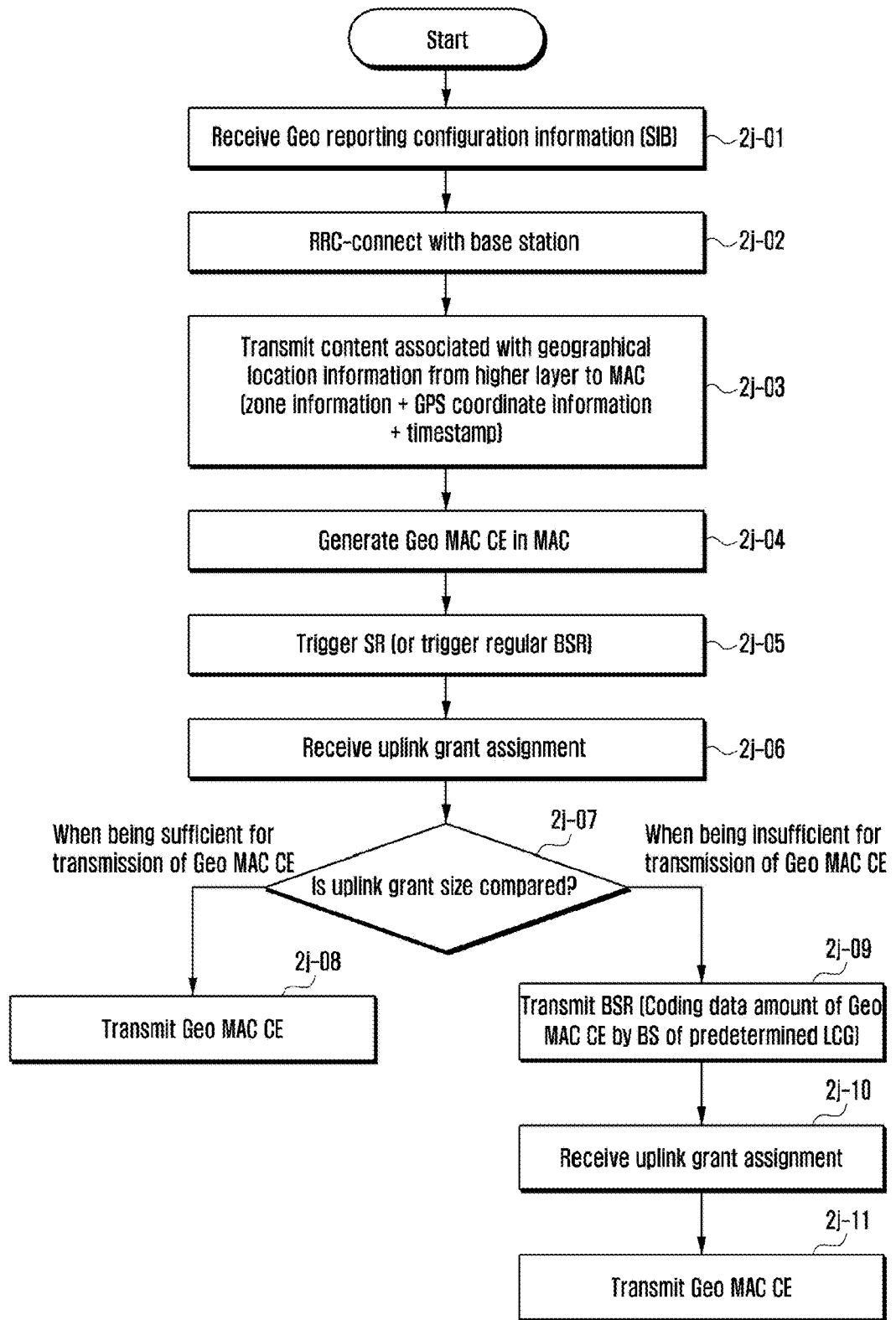
FIG. 2J is a diagram illustrating an operation of the terminal for transmitting the geographical location information to the base station according to the second embodiment of the present invention.

FIG. 2J is a diagram illustrating an operation of the terminal for transmitting the geographical location information to the base station according to the second embodiment of the present invention.

In step 2*j*-01, the terminal supporting the V2V receives the SIB from the base station. At this point, the SIB for the V2V may be used by extending the existing SIB18 or by defining a new SIB. In addition to the information (transmission/reception resources and synchronization configuration information) included in the existing SIB 18, a geographical location information reporting period, zone size information (for example, horizontal length X[m], vertical length Y[m]), and configuration information for reporting geographical location information such as the number of zones present in the cell may be included.

In step 2*j*-02, the terminal may perform RRC connection with the base station to perform the V2V communication in mode 1 with other terminals.

In step 2*j*-03, the terminal may transmit the geographical location information obtained from the higher layer to the MAC. This is to allow the base station to assign transmission resources based on geographical location information so as to reduce the collision of resources with other terminals. The information may include the GPS coordinate information, the zone index information, the timestamp (time when the GPS information is acquired), and the like.

In step 2*j*-04, the MAC may generate the Geo MAC CE including the information transmitted from the higher layer. In step 2*j*-05, the generated Geo MAC CE may trigger the SR or trigger the regular BSR.

In step 2*j*-06, the terminal may be assigned the uplink grant from the base station and in step 2*j*-07, the terminal may compare the size of the assigned uplink grant with the size of the Geo MAC CE. If the size of the assigned uplink grant is sufficient for the transmission of the Geo MAC CE, in step 2*j*-08, the terminal may transmit the Geo MAC CE. However, if the size of the assigned uplink grant is insufficient for the transmission of the Geo MAC CE, in step 2*j*-09, the terminal may transmit the BSR to the base station by coding the amount of data of the Geo MAC CE with the BS of the predetermined LCG the BSR. In step 2*j*-10, the terminal may be assigned the uplink grant from the base station, and in step 2*j*-11, the terminal may transmit the Geo MAC CE through the assigned uplink grant.

Figure 2K:
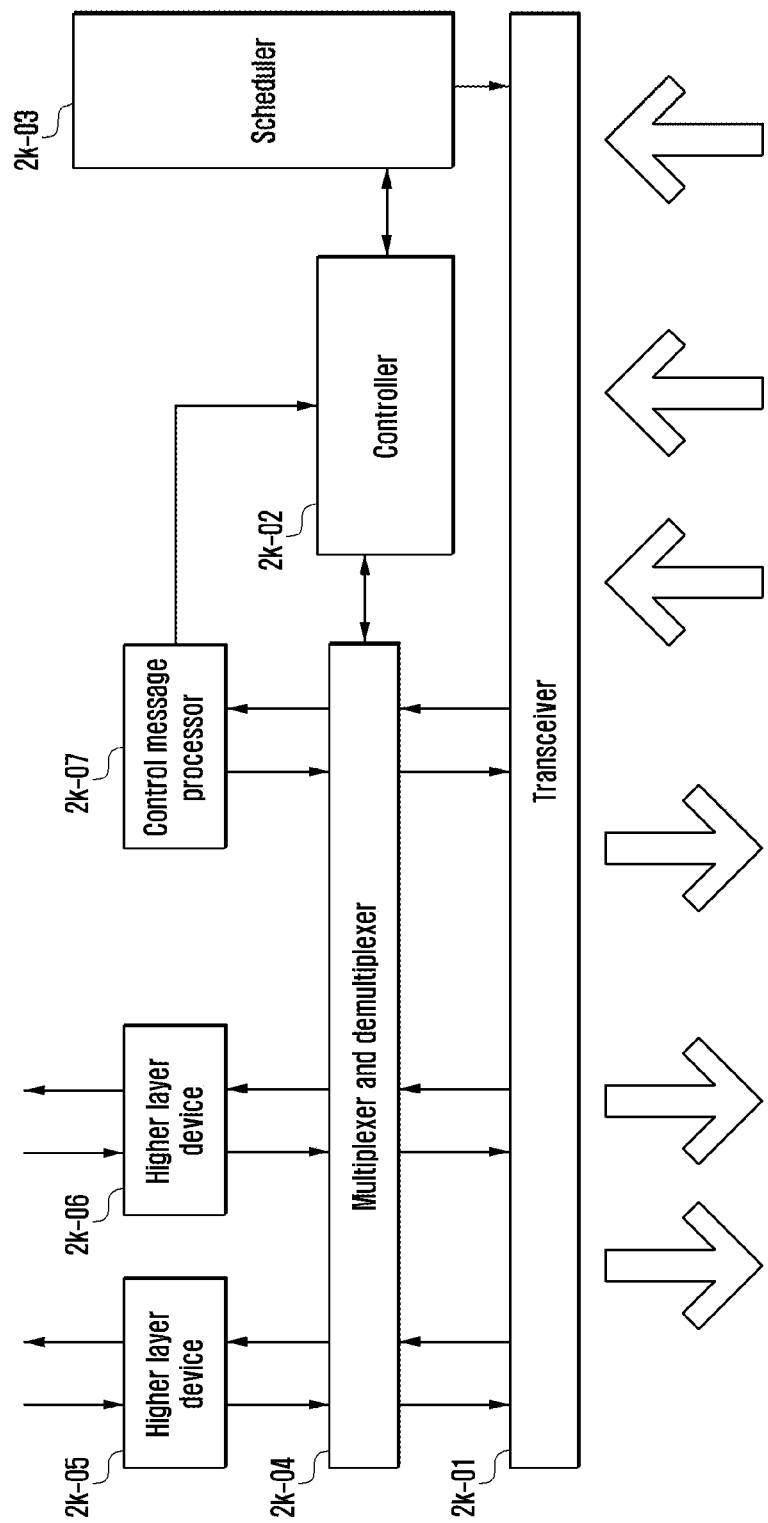
FIG. 2K is a block diagram illustrating a configuration of the base station according to the second embodiment of the present invention.

FIG. 2K is a block diagram illustrating a configuration of the base station according to the second embodiment of the present invention.

As illustrated in FIG. 2K, the base station of the present invention may include at least one of a transceiver 2*k*-01, a controller 2*k*-02, a multiplexer and demultiplexer 2*k*-04, a control message processor 2*k*-04, various higher layer devices 2*k*-05 and 2*k*-06, and a scheduler 2*k*-03.

The transceiver 2*k*-01 transmits data and a predetermined control signal through a forward carrier and receives the data and the predetermined control signal through a reverse carrier. When a plurality of carriers are configured, the transceiver 2*k*-01 transmits and receives the data and the control signal through the plurality of carriers.

The multiplexer and demultiplexer 2*k*-04 serves to multiplex the data generated from the higher layer devices 2*k*-05 and 2k-06 or the control message processor 2k-07 or demultiplex the data received by the transceiver 2k-01 and transmit the demultiplexed data to the higher layer processors 2k-05 and 2k-06, the control message processor 2k-07, or the controller 2k-02.

The control message processor 2k-07 allows the terminal to process the control messages such as the transmitted RRC message and MAC CE to perform the required operation or generates the control message to be transmitted to the terminal and transmits the generated control message to the lower layer.

The higher layer processors 2k-05 and 2k-06 may be configured for each terminal and each service and processes data generated from user services such as FTP and VoIP and transmits the processed data to the multiplexer and demultiplexer 2k-04 or processes data transmitted from the multiplexer and demultiplexer 2k-04 and transmits the processed data to service applications of the higher layer. The controller 2k-02 manages a response operation to the request of the terminal and transmits it to the transceiver. The scheduler 2k-03 assigns a transmission resource to the terminal at appropriate timing in consideration of a buffer status and a channel status of the terminal, an active time and a service request of the terminal, etc. and allows the transceiver to process a signal transmitted from the terminal or performs a process to transmit a signal to the terminal.

The controller 2k-02 may control the overall operation according to the second embodiment of the present invention.

For example, the controller 2k-02 may receive a first message including assistance information associated with the semi-persistent scheduling (SPS) of the V2X communication from the terminal and may transmit a second message including the SPS configuration information of the V2V communication to the terminal and a third message including control information associated with the SPS activation of the V2V communication to the terminal. The assistance information associated with the SPS may include at least one of the period information, the time offset information, and the message size information associated with the SPS. The SPS configuration information includes information associated with a plurality of SPS setting and the control information may include information indicating whether each of the plurality of SPSs is activated. The first and second messages may be transmitted through the radio resource control (RRC) signaling and the third message may be transmitted through the physical uplink control channel (PUCCH).

Figure 2L:
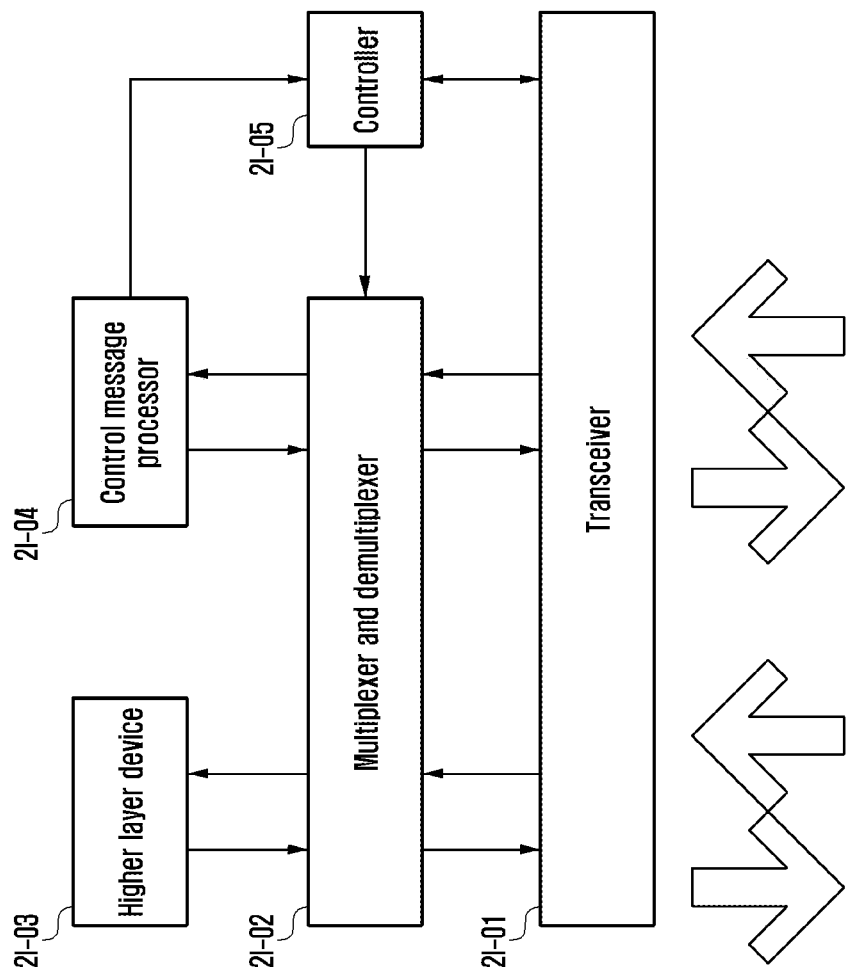
FIG. 2L is a block diagram illustrating a configuration of the terminal according to the second embodiment of the present invention.

FIG. 2L is a block diagram illustrating a configuration of the terminal according to the embodiment of the present invention.

As illustrated in FIG. 2L, the terminal supporting the LTE and the V2V of the present invention includes a transceiver 2l-01, a multiplexer and demultiplexer apparatus 2l-02, an higher layer device 2l-03, a control message processor 2l-04, and a controller 2l-05.

The terminal transmits and receives data, or the like to and from the higher layer device 2l-03 and transmits and receives control messages from the base station through the control message processor 2l-04. It includes a function of processing the control messages such as the RRC message and the MAC CE. Further, when the terminal transmits a control signal or data to the base station or another terminal, the terminal multiplexes the control signal or the data through the multiplexer 2l-02 according to the control of the controller 2l-05 and then transmits data to other terminals through the transmitter 2l-01. Further, when the terminal receives the control signal or data from the base station or another terminal, the terminal receives a signal using the receiver 2l-01 according to the control of the controller 2l-5 and demultiplexes the signal by the demultiplexer 2l-02.

Meanwhile, it is described above that the terminal is configured of a plurality of blocks and each block performs different functions, which is only embodiment and therefore is not necessarily limited thereto. For example, the controller 2l-05 itself may also perform the function performed by the demultiplexer 2l-02.

The controller 2l-02 may control the overall operation according to the second embodiment of the present invention.

For example, the controller 2l-02 may transmit the first message including the assistance information associated with the semi-persistent scheduling (SPS) of the V2X communication to the base station and may receive the second message including the SPS configuration information of the V2V communication from the base station and the third message including the control information associated with the SPS activation of the V2V communication from the base station. Further, the controller 2l-02 may transmit data to another terminal based on the SPS configuration information and the control information. The methods according to the embodiments described in claims or specification of the present invention may be implemented in hardware, software, or a combination of hardware and software.

When the methods are implemented in the software, a computer readable storage medium storing at least one program (software module) may be provided. At least one programs stored in the computer readable storage medium is configured to be executed by at least one processor within an electronic device. At least one program includes instructions that allow the electronic device to execute the methods according to the embodiments described in the claims or specification of the present invention.

The program (software module, software) may be stored a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other types of optical storage apparatuses, and a magnetic cassette. Alternatively, the programs may be stored in the memory that is configured of a combination of some or all of the memories. Further, each memory may also be included in plural.

Further, the program may be stored in an attachable storage device that may be accessed through communication networks such as Internet, an intranet, a local area network (LAN), a wide LAN (WLAN), and a storage area network (SAN) or a communication network configured in a combination thereof. The storage device may access an apparatus performing the embodiment of the present invention through an external port. Further, a separate storage device on the communication network may also access the apparatus performing the embodiment of the present invention.

In the detailed embodiments of the present invention, components included in the present invention are represented by a singular number or a plural number according to the detailed embodiment as described above. However, the expressions of the singular number or the plural number are selected to meet the situations proposed for convenience of explanation and the present invention is not limited to the single component or the plural components and even through the components are represented in plural, the component may be configured in a singular number or even though the components are represented in a singular number, the component may be configured in plural.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A vehicle-to-everything (V2X) communication method by a terminal in a wireless communication system, the method comprising:
   transmitting, to a base station, a first message including assistance information associated with a semi-persistent scheduling (SPS) for the V2X communication;
   receiving, from the base station, a second message including SPS configuration information for the V2X communication;
   receiving, from the base station, a third message including downlink control information (DCI) associated with activation of the SPS for the V2X communication; and
   transmitting, to another terminal, data based on the SPS configuration information and the DCI,
   wherein the assistance information associated with the SPS includes at least one of period information and timing offset information.

2. The method of claim 1, wherein the assistance information associated with the SPS further includes message size information associated with the SPS.

3. The method of claim 1, wherein the SPS configuration information includes information for configuring a plurality of the SPS, and
   the DCI includes information indicating whether to activate each of the plurality of the SPS.

4. The method of claim 1, wherein the second message is transmitted on a radio resource control (RRC) signaling, and
   the third message is transmitted on physical downlink control channel.

5. A method by a base station supporting a vehicle-to-everything (V2X) communication in a wireless communication system, the method comprising:
   receiving, from a terminal, a first message including assistance information associated with a semi-persistent scheduling (SPS) for the V2X communication;
   transmitting, to the terminal, a second message including SPS configuration information for the V2X communication; and
   transmitting, to the terminal, a third message including downlink control information (DCI) associated with activation of the SPS for the V2X communication,
   wherein data is transmitted from the terminal to another terminal based on the SPS configuration information and the DCI, and
   wherein the assistance information associated with the SPS includes at least one of period information and timing offset information.

6. The method of claim 5, wherein the assistance information associated with the SPS further includes message size information associated with the SPS.

7. The method of claim 5, wherein the SPS configuration information includes information for configuring a plurality of the SPS, and
   the DCI includes information indicating whether to activate each of the plurality of the SPS.

8. The method of claim 5, wherein the second message is transmitted on a radio resource control (RRC) signaling, and the third message is transmitted on physical downlink control channel.

9. A terminal performing a vehicle-to-everything (V2X) communication in a wireless communication system, the terminal comprising:
   a transceiver; and
   a controller coupled with the transceiver and configured to control to:
   transmit, to a base station, a first message including assistance information associated with a semi-persistent scheduling (SPS) for the V2X communication;
   receive, from the base station, a second message including SPS configuration information for the V2X communication;
   receive, from the base station, a third message including downlink control information (DCI) associated with activation of the SPS for the V2X communication; and
   transmit, to another terminal, data based on the SPS configuration information and the DCI,
   wherein the assistance information associated with the SPS includes at least one of period information and timing offset information.

10. The terminal of claim 9, wherein the assistance information associated with the SPS further includes message size information associated with the SPS.

11. The terminal of claim 9, wherein the SPS configuration information includes information for configuring a plurality of the SPS, and
    the DCI includes information indicating whether to activate each of the plurality of the SPS.

12. The terminal of claim 9, wherein the second message is transmitted on a radio resource control (RRC) signaling, and
    the third message is transmitted on physical downlink control channel.

13. A base station supporting a vehicle-to-everything (V2X) communication in a wireless communication system, the base station comprising:
    a transceiver; and
    a controller coupled with the transceiver and configured to control to:
    receive, from a terminal, a first message including assistance information associated with a semi-persistent scheduling (SPS) for the V2X communication;
    transmit, to the terminal, a second message including SPS configuration information for the V2X communication; and
    transmit, to the terminal, a third message including downlink control information (DCI) associated with activation of the SPS for the V2X communication,
    wherein data is transmitted from the terminal to another terminal based on the SPS configuration information and the DCI, and
    wherein the assistance information associated with the SPS includes at least one of period information and timing offset information.

14. The base station of claim 13, wherein the assistance information associated with the SPS further includes message size information associated with the SPS.

15. The base station of claim 13, wherein the SPS configuration information includes information for configuring a plurality of the SPS, and
    the DCI includes information indicating whether to activate each of the plurality of the SPS.

* * * * *